US009736646B2

(12) United States Patent
Spears et al.

(10) Patent No.: US 9,736,646 B2
(45) Date of Patent: Aug. 15, 2017

(54) SYSTEMS AND METHODS TO SELECT LOCATIONS OF INTEREST BASED ON DISTANCE FROM ROUTE POINTS OR ROUTE PATHS

(71) Applicant: Visa International Service Association, San Francisco, CA (US)

(72) Inventors: Joseph Spears, Hayward, CA (US); Mark Carlson, Half Moon Bay, CA (US); Patrick Stan, Pacifica, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/208,989

(22) Filed: Jul. 13, 2016

(65) Prior Publication Data
US 2016/0323711 A1  Nov. 3, 2016

Related U.S. Application Data

(63) Continuation of application No. 14/163,877, filed on Jan. 24, 2014, now Pat. No. 9,439,036.
(Continued)

(51) Int. Cl.
*H04M 3/42* (2006.01)
*H04W 4/02* (2009.01)
(Continued)

(52) U.S. Cl.
CPC ........ *H04W 4/023* (2013.01); *G01C 21/3484* (2013.01); *H04L 67/306* (2013.01);
(Continued)

(58) Field of Classification Search
CPC ....... H04W 4/206; H04W 4/02; H04W 4/027; H04W 4/023; H04W 4/18
(Continued)

(56) References Cited

U.S. PATENT DOCUMENTS 6,108,639 A   8/2000 Walker et al.
6,216,086 B1  4/2001 Seymour et al.
(Continued)

FOREIGN PATENT DOCUMENTS

WO   9922328      5/1999
WO   0137183      5/2001
WO   2009035469   3/2009

OTHER PUBLICATIONS

European Patent Application No. 07854595.1, Search Report, Dec. 16, 2010.
(Continued)

*Primary Examiner* — Charles Appiah
*Assistant Examiner* — Jaime Holliday
(74) *Attorney, Agent, or Firm* — Greenberg Traurig, LLP

(57) ABSTRACT

Selection of offers, locations or merchants based on their distances from a portion of a user's route and their affinity for the user is disclosed. A route employed by a user for travelling to a destination is obtained and segmented at identified vertices. Locations that are proximate to the route segments are determined. The proximate locations are further analyzed to obtain their specific distances from a selected portion such as the user's origin or destination or any route segment. Location based services are associated with those proximate locations that are closest to the selected portion on the user's route or those with the better utility.

14 Claims, 38 Drawing Sheets

Related U.S. Application Data

(60) Provisional application No. 61/756,860, filed on Jan. 25, 2013, provisional application No. 61/756,858, filed on Jan. 25, 2013.

(51) Int. Cl.
  *H04W 8/18* (2009.01)
  *G01C 21/34* (2006.01)
  *H04L 29/08* (2006.01)

(52) U.S. Cl.
  CPC ........... *H04W 4/022* (2013.01); *H04W 4/028* (2013.01); *H04W 8/18* (2013.01); *H04W 4/02* (2013.01); *H04W 4/026* (2013.01)

(58) Field of Classification Search
  USPC ...................... 455/414.1–414.2, 456.1–456.6
  See application file for complete search history.

(56) References Cited

U.S. PATENT DOCUMENTS

| | | |
|---|---|---|
| 6,332,126 B1 | 12/2001 | Peirce et al. |
| 6,587,835 B1 | 7/2003 | Treyz et al. |
| 6,592,033 B2 | 7/2003 | Jennings et al. |
| 6,684,195 B1 | 1/2004 | Deaton et al. |
| 6,711,408 B1 | 3/2004 | Raith |
| 6,868,393 B1 | 3/2005 | Demsky et al. |
| 6,957,074 B2 | 10/2005 | Wang et al. |
| 7,107,226 B1 | 9/2006 | Cassidy et al. |
| 7,107,227 B1 | 9/2006 | Bezos et al. |
| 7,127,415 B1 | 10/2006 | Verchere |
| 7,181,438 B1 | 2/2007 | Szabo |
| 7,200,566 B1 | 4/2007 | Moore et al. |
| 7,324,896 B1 | 1/2008 | Smith |
| 7,546,202 B2 | 6/2009 | Oh |
| 7,546,206 B1 | 6/2009 | Miller et al. |
| 7,747,300 B1 | 6/2010 | de Barros |
| 7,788,293 B2 | 8/2010 | Pasztor et al. |
| 8,116,972 B2 | 2/2012 | Klampfl et al. |
| 8,175,908 B1 | 5/2012 | Anderson |
| 8,401,786 B2 | 3/2013 | Poppen et al. |
| 9,332,396 B2 | 5/2016 | Spears |
| 9,439,036 B2 | 9/2016 | Spears et al. |
| 2001/0014868 A1 | 8/2001 | Herz et al. |
| 2001/0032128 A1 | 10/2001 | Kepecs |
| 2001/0049636 A1 | 12/2001 | Hudda et al. |
| 2001/0056395 A1 | 12/2001 | Khan |
| 2002/0026380 A1 | 2/2002 | Su |
| 2002/0052782 A1 | 5/2002 | Landesmann |
| 2002/0120398 A1* | 8/2002 | Matsuda ................ G01C 21/20 701/433 |
| 2002/0120496 A1 | 8/2002 | Scroggie et al. |
| 2002/0161670 A1 | 10/2002 | Walker et al. |
| 2002/0178070 A1 | 11/2002 | Leveridge |
| 2002/0194069 A1 | 12/2002 | Thakur et al. |
| 2003/0004743 A1 | 1/2003 | Callegari |
| 2003/0065805 A1 | 4/2003 | Barnes, Jr. |
| 2003/0083961 A1 | 5/2003 | Bezos et al. |
| 2003/0177058 A1 | 9/2003 | Needham |
| 2004/0064351 A1 | 4/2004 | Mikurak |
| 2004/0162889 A1 | 8/2004 | Morris et al. |
| 2005/0055281 A1 | 3/2005 | Williams |
| 2005/0144111 A1 | 6/2005 | Manstein et al. |
| 2005/0149385 A1 | 7/2005 | Trively |
| 2005/0159974 A1 | 7/2005 | Moss et al. |
| 2005/0187873 A1 | 8/2005 | Labrou et al. |
| 2005/0199707 A1 | 9/2005 | Beck et al. |
| 2006/0015414 A1 | 1/2006 | Congram et al. |
| 2006/0143080 A1 | 6/2006 | Garg et al. |
| 2006/0167753 A1 | 7/2006 | Teague et al. |
| 2006/0190348 A1 | 8/2006 | Ofer et al. |
| 2006/0212355 A1 | 9/2006 | Teague et al. |
| 2006/0231611 A1 | 10/2006 | Chakiris et al. |
| 2006/0287810 A1 | 12/2006 | Sadri et al. |
| 2006/0293971 A1 | 12/2006 | Hunter et al. |
| 2007/0005419 A1 | 1/2007 | Horvitz et al. |
| 2007/0061245 A1 | 3/2007 | Ramer et al. |
| 2007/0150334 A1 | 6/2007 | Bergh et al. |
| 2007/0150352 A1 | 6/2007 | Kelly-Frank et al. |
| 2007/0192183 A1 | 8/2007 | Monaco et al. |
| 2007/0210155 A1 | 9/2007 | Swartz et al. |
| 2008/0021767 A1 | 1/2008 | Benson et al. |
| 2008/0076451 A1* | 3/2008 | Sheha ................ G01C 21/3679 455/456.3 |
| 2008/0120022 A1 | 5/2008 | Hayot et al. |
| 2008/0154694 A1 | 6/2008 | Litzow et al. |
| 2008/0156873 A1 | 7/2008 | Wilhelm et al. |
| 2008/0248815 A1* | 10/2008 | Busch ..................... H04W 4/02 455/456.5 |
| 2008/0263035 A1 | 10/2008 | Episale et al. |
| 2008/0300973 A1 | 12/2008 | DeWitt et al. |
| 2008/0319843 A1 | 12/2008 | Moser et al. |
| 2009/0076896 A1 | 3/2009 | DeWitt et al. |
| 2009/0076925 A1 | 3/2009 | DeWitt et al. |
| 2009/0208313 A1 | 8/2009 | Hayashi et al. |
| 2010/0274680 A1 | 10/2010 | Carlson et al. |
| 2010/0287103 A1 | 11/2010 | Mason |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0106429 A1* | 5/2011 | Poppen .............. G01C 21/3476 701/533 |
| 2011/0137551 A1 | 6/2011 | Peri |
| 2011/0161136 A1 | 6/2011 | Faith et al. |
| 2011/0231223 A1 | 9/2011 | Winters |
| 2011/0313858 A1 | 12/2011 | DeWitt et al. |
| 2012/0059718 A1 | 3/2012 | Ramer et al. |
| 2012/0185163 A1* | 7/2012 | Boschker .............. G01C 21/343 701/411 |
| 2012/0215612 A1 | 8/2012 | Ramer et al. |
| 2013/0134962 A1 | 5/2013 | Kamel et al. |
| 2013/0151148 A1 | 6/2013 | Parundekar et al. |
| 2013/0166586 A1 | 6/2013 | Pfeifle et al. |
| 2014/0095071 A1* | 4/2014 | Srikanteswara ...... G01S 5/0252 701/533 |
| 2014/0136104 A1 | 5/2014 | Spears et al. |
| 2014/0172576 A1 | 6/2014 | Spears et al. |
| 2014/0213300 A1 | 7/2014 | Spears et al. |
| 2014/0236678 A1 | 8/2014 | Akerman et al. |
| 2014/0244353 A1 | 8/2014 | Winters |
| 2014/0304130 A1 | 10/2014 | Winters et al. |
| 2015/0264532 A1 | 9/2015 | Spears |

OTHER PUBLICATIONS

European Patent Application No. 07864052.1, Extended Search Report, Dec. 22, 2010.
International Patent Application PCT/US07/83946, International Search Report and Written Opinion, Mar. 4, 2008.
International Patent Application PCT/US07/83963, International Search Report and Written Opinion, Mar. 4, 2008.
International Patent Application PCT/US07/83973, International Search Report and Written Opinion, May 5, 2008.
International Patent Application PCT/US07/83983, International Search Report and Written Opinion, Mar. 28, 2008.

\* cited by examiner

| | |
|---|---|
| $0° = 1 * 2.5 + 0 * 1.8028$<br>$\quad = 2.5$ | $1.5 + 1 = 2.5$<br>$\sqrt{(\frac{3}{2})^2 + 1^2} = 1.8028$ |
| $180° = 0 * 2.5 + 1 * 1.8028$<br>$\quad\quad = 1.8028$<br><br>$45° = \cos(45/2)^2 * (1.5+1) +$<br>$\quad\quad \sin(45/2)^2 * \sqrt{(\frac{3}{2})^2 + 1^2}$<br>$\quad = 0.8536 * 2.5 + 0.1464 * 1.8028$<br>$\quad = 2.134 + 0.2639$<br>$\quad = 2.39 > 9$ | <table><tr><th>Angle</th><th>1/2 sin</th><th>1/2 cos</th></tr><tr><td>0</td><td>0</td><td>1</td></tr><tr><td>45</td><td>0.3827</td><td>0.9239</td></tr><tr><td>90</td><td>0.7071</td><td>0.7071</td></tr><tr><td>135</td><td>0.9838</td><td>0.3827</td></tr><tr><td>180</td><td>1</td><td>0</td></tr></table> |
| $135° = \cos(135/2)^2 * 2.5 +$<br>$\quad\quad \sin(135/2)^2 * 1.8028$<br>$\quad = 0.3663 + 1.5389$<br>$\quad = 1.9052$ | $90° = \cos(90/2)^2 * (1.5+1) +$<br>$\quad\quad \sin(90/2)^2 * \sqrt{(\frac{3}{2})^2 + 1^2}$<br>$\quad = 0.5 * 2.5 + 0.5 * 1.8028$<br>$\quad = 1.25 + 0.9014$<br>$\quad = 2.1514$ |

FIG. 26

SYSTEMS AND METHODS TO SELECT LOCATIONS OF INTEREST BASED ON DISTANCE FROM ROUTE POINTS OR ROUTE PATHS

RELATED APPLICATIONS

The present application is a continuation application of U.S. patent application Ser. No. 14/163,877, filed Jan. 24, 2014 and entitled "Systems and Methods to Select Locations of Interest based on Distance from Route Points or Route Paths", which claims priority to Prov. U.S. Pat. App. Ser. No. 61/756,860 filed Jan. 25, 2013 and entitled "Systems and Methods to Select Locations of Interest based on Distance from Route Points", and Prov. U.S. Pat. App. Ser. No. 61/756,858 filed Jan. 25, 2013 and entitled "Systems and Methods to Select Locations of Interest based on Distance from Route Paths", the entire disclosures of which applications are hereby incorporated herein by reference.

The present application relates to U.S. patent application Ser. No. 14/075,518, filed Nov. 8, 2013, published as U.S. Pat. App. Pub. No. 2014/0136104, and entitled "Systems and Methods for Route Prediction", and U.S. patent application Ser. No. 14/106,018, filed Dec. 13, 2013, published as U.S. Pat. App. Pub. No. 2014/0172576, and entitled "Systems and Methods to Select Locations of Interest", the entire disclosures of which applications are incorporated herein by reference.

FIELD OF THE TECHNOLOGY

At least some embodiments of the present disclosure relate to the selection of offers or locations based on their distance to an origin, a destination or a route path of a predicted or actual route and their affinity for a user.

BACKGROUND

Millions of transactions occur daily through the use of payment cards, such as credit cards, debit cards, prepaid cards, etc. Corresponding records of the transactions are recorded in databases for settlement and financial record-keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as a cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 26 shows an embodiment for calculation of a weighted radius that is based on the angle at a vertex.

DETAILED DESCRIPTION

Introduction

Figure 1:
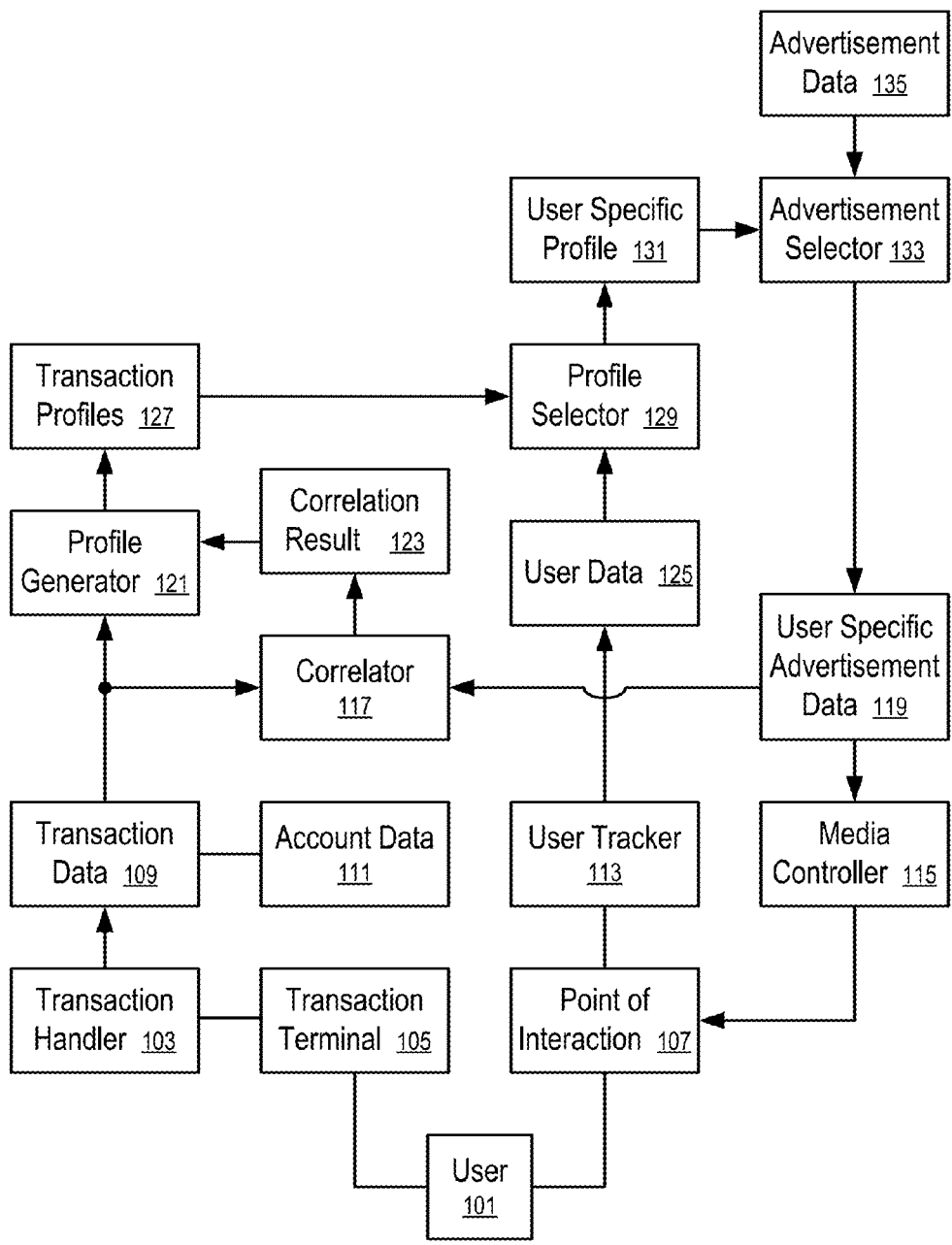
FIG. 1 illustrates a system to provide services based on transaction data according to one embodiment.

Many location based services are provided via real-time messaging. Loyalty programs monitor user habits and provide services in real-time that are relevant to the current user context. For example, when a user stops at specific location, coupons or discounts related to retail locations at the user's current locale can be provided to the user in real-time. However, such services tend to be more reactive and are not very proactive. These services are operative only when the user is actually situated in a particular location or if it is known with great accuracy that the user will be at the particular location. They do not operate to proactively draw the user's attention or encourage the user to visit a particular location that may be close to the user's route but which the user may not intend to visit. Hence, systems which monitor a current route being traversed by a user and which predict locations of interest that are along the user's current route and within a predetermined threshold distance from the user's current route need can be used to attract users to specific locations. The systems which monitor a user's current routes encourage the user to visit locations which the user did not initially intend to visit as they are configured to pick those locations that are at are proximate from the user's current route or are otherwise suited to the user's current context. In certain embodiments, the user's intentions can be derived by monitoring the user's current route settings or predicting the user's route by accessing contextual information from real-time or archived sources.

When the locations of interest are determined, non-transaction data can be used to send real-time messages pertaining to the predicted locations of interest. By employing knowledge of a predicted route or a route selected for traversal by a user, locations of interest to the user along the selected route can be determined and location based services targeted to such predicted locations can be advertised to the user. In an embodiment, the locations of interest can be predicted by predicting the likely route of the user. In an embodiment, further filtering of the locations of interest can be achieved by weighing the distances with user specific data such as a user's affinity for particular vendors or merchants or locations.

Typical shopping patterns for users show a predisposition to select merchants based on their proximity to points along a route combined with the affinity for particular offers. Various embodiments disclosed herein pertain to selecting offers and merchants along a user's route both with and without affinities attached to them. The offers or merchants can be selected based on their distances to the origin or destination of a route and the affinity. The user, therefore, does not have to deviate far from their current route to visit the associated locations and hence may be motivated to capitalize on the location based services.

The transaction data, such as records of transactions made via credit accounts, debit accounts, prepaid accounts, bank accounts, stored value accounts and the like, can be further processed to optionally provide information for various services, such as reporting, benchmarking, advertising, content or offer selection, customization, personalization, prioritization, etc. In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. The transaction handler may be further automated to process the advertisement fees charged to the advertisers, using the accounts of the advertisers, in response to the advertising activities.

For example, the computing apparatus can be configured to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

For example, the computing apparatus can be programmable for real-time interaction with users to provide messages and/or offers, validate fulfillment conditions, and provide benefits to qualified users to fulfill the offers. In one embodiment, the computing apparatus is configured to be programmed via accepting definitions of independent events and linking the events via prerequisite requirements to specify qualification conditions. The linked events form a flow or network of events; and user progress in the flow or network of events is tracked. The operations for each event are performed in an atomic way to allow the user positions in the flow or network of events to be identified as being in between adjacent events in the network. As a result, the programming of the real-time interaction, including the offer rules and messages, can be easily modified during the execution of the programming. Details in one embodiment regarding the formulation and management of real-time interaction are provided in the section entitled "RULE FORMATION AND MANAGEMENT."

For example, the computing apparatus can be configured to allow a user to use any of a plurality of registered accounts to participate in an offer campaign, such as performing transactions in the registered accounts to fulfill requirements to obtain the benefit of the offer campaign. In one embodiment, the offer campaign is programmed by offer rules that identify the real time interactions with the user in response to the actions of the user, such as transactions made using any of the registered accounts of the user. The offer campaign for the user is driven at least in part by the actions of the user, such as the transactions made by the user. In one embodiment, transactions in the registered accounts of the user jointly advances the offer campaign for the user; and a milestone achieved in the offer campaign using one account of the user is recognized as a milestone achieved by the user with respect to the multiple registered accounts. Thus, the offer campaign for the user can be advanced by the user via different accounts, as if the registered accounts were a same account; and the user is not limited to using a particular account to participate in the offer campaign, nor using different accounts to drive the offer campaign separately, as if the accounts were assigned to different users. Details in one embodiment regarding the configuration of real time interactions using multiple accounts of a user are provided in the section entitled "MULTIPLE ACCOUNTS."

In one embodiment, the computing apparatus is configured to target the same offer differently to users based on the media channels used to deliver the offer. An offer can be configured to include first qualification conditions formulated based on triggering events, such as the current location of a user, the current transaction of the user as being processed by a transaction handler, and second qualification conditions not based on such triggering events. To users reachable via a first set of media channels, the first qualification conditions are ignored in selecting candidate users for the delivery of the offer; and the candidate users are selected based on the second qualification conditions. If the offer has not be delivered to a user via the first set of media channels, the computing apparatus is configured to deliver the offer to the user via a second set of media channels, when the user satisfies both the first qualification conditions and the second qualification conditions. Details in one embodiment are provided in the section entitled "MULTIPLE MEDIA CHANNELS."

In one embodiment, a system and method is configured to allow an offer campaign to be specified based on requirements of transactions with multiple merchants. Details in one embodiment are provided in the section entitled "MULTIPLE MERCHANTS."

In one embodiment, the computing apparatus correlates transactions with activities that occurred outside the context of the transaction, such as online advertisements presented to the customers that at least in part cause offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

Transaction Data Based Services

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 1, the system further includes a correlator (117) to correlate user specific advertisement data (119) with transactions resulting from the user specific advertisement data (119). The correlation results (123) can be used by the profile generator (121) to improve the transaction profiles (127).

Figure 2:
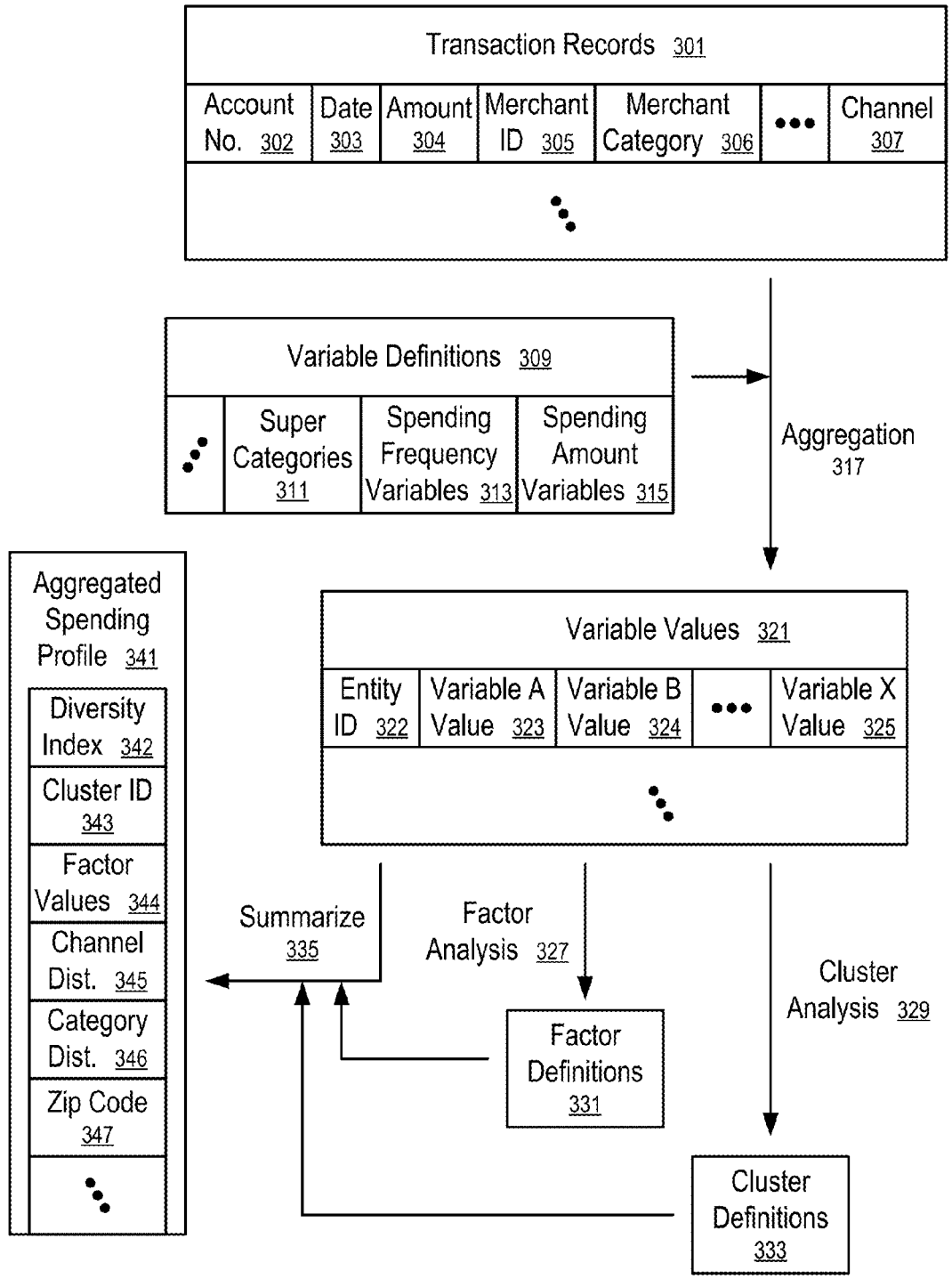
FIG. 2 illustrates the generation of an aggregated spending profile according to one embodiment.
Figure 3:
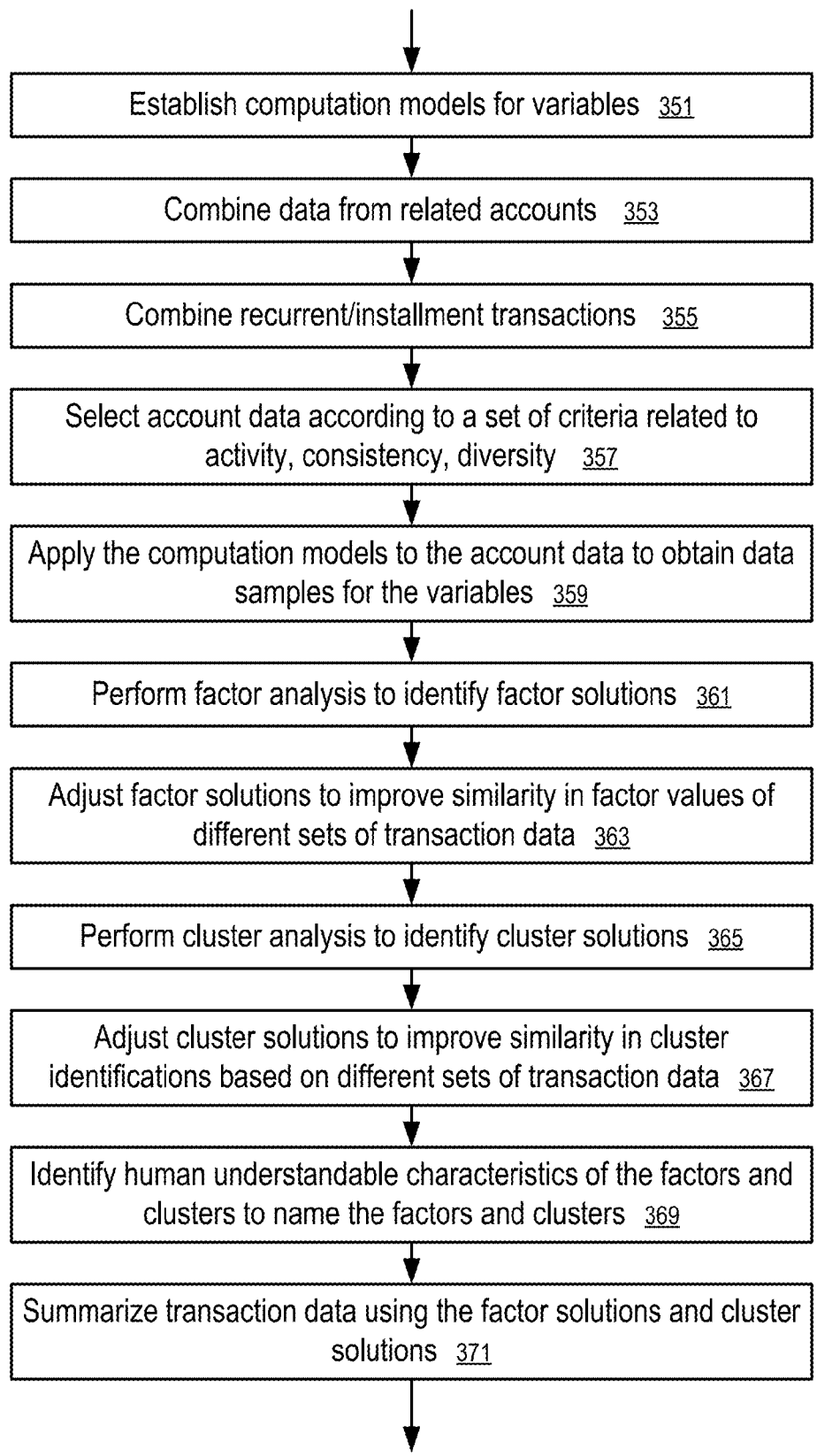
FIG. 3 shows a method to generate an aggregated spending profile according to one embodiment.

The transaction profiles (127) of one embodiment are generated from the transaction data (109) in a way as illustrated in FIGS. 2 and 3. For example, in FIG. 2, an aggregated spending profile (341) is generated via the factor analysis (327) and cluster analysis (329) to summarize (335) the spending patterns/behaviors reflected in the transaction records (301).

Figure 4:
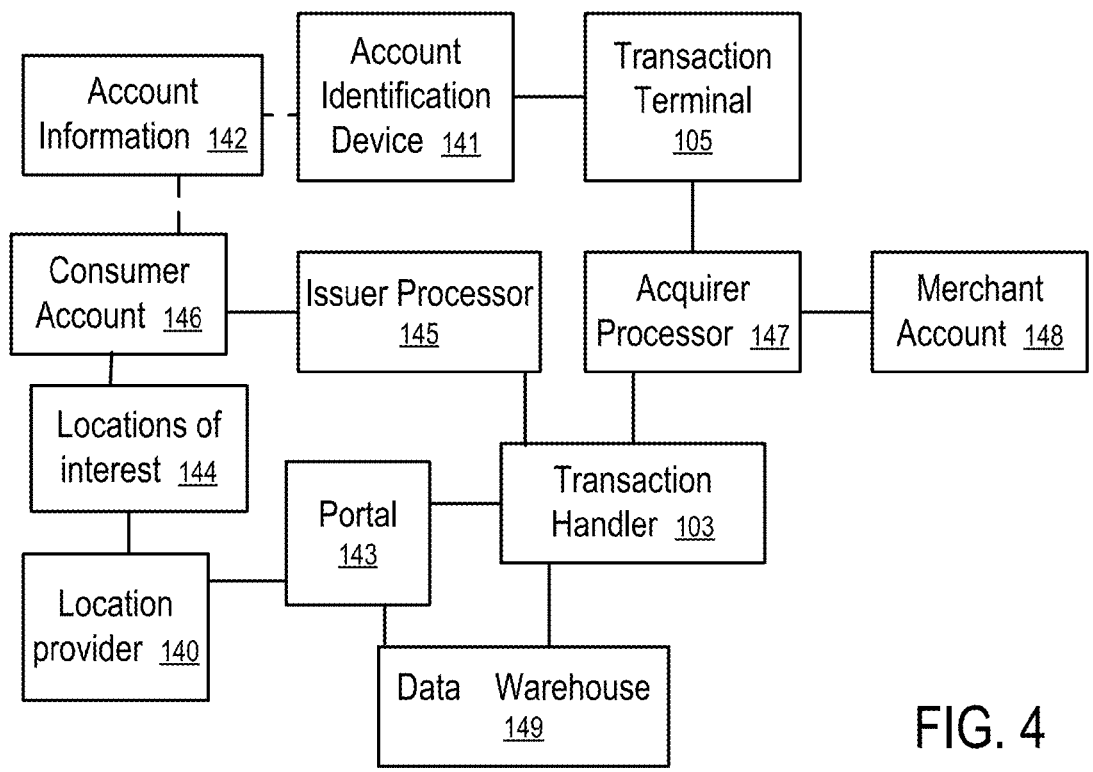
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
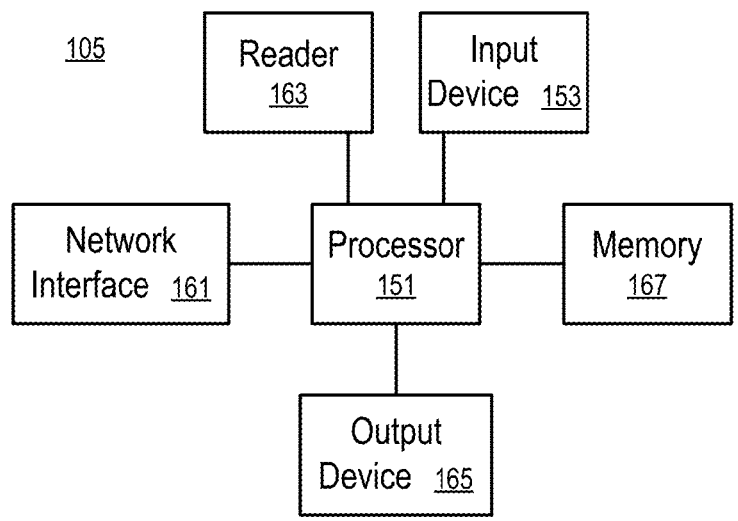
FIG. 5 illustrates a transaction terminal according to one embodiment.
Figure 6:
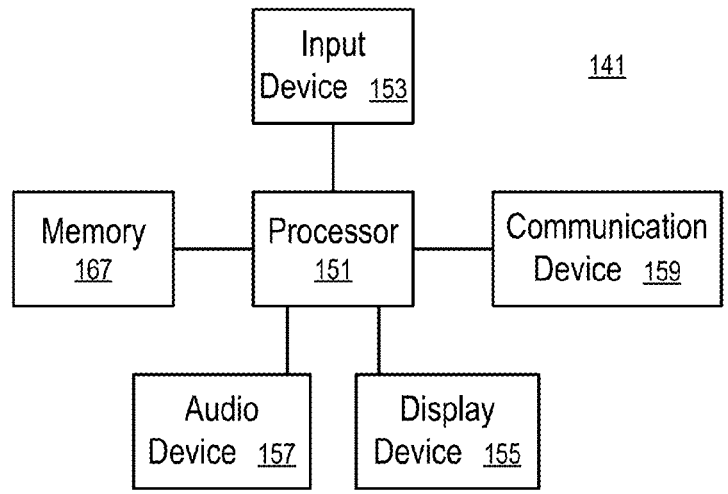
FIG. 6 illustrates an account identifying device according to one embodiment.
Figure 7:
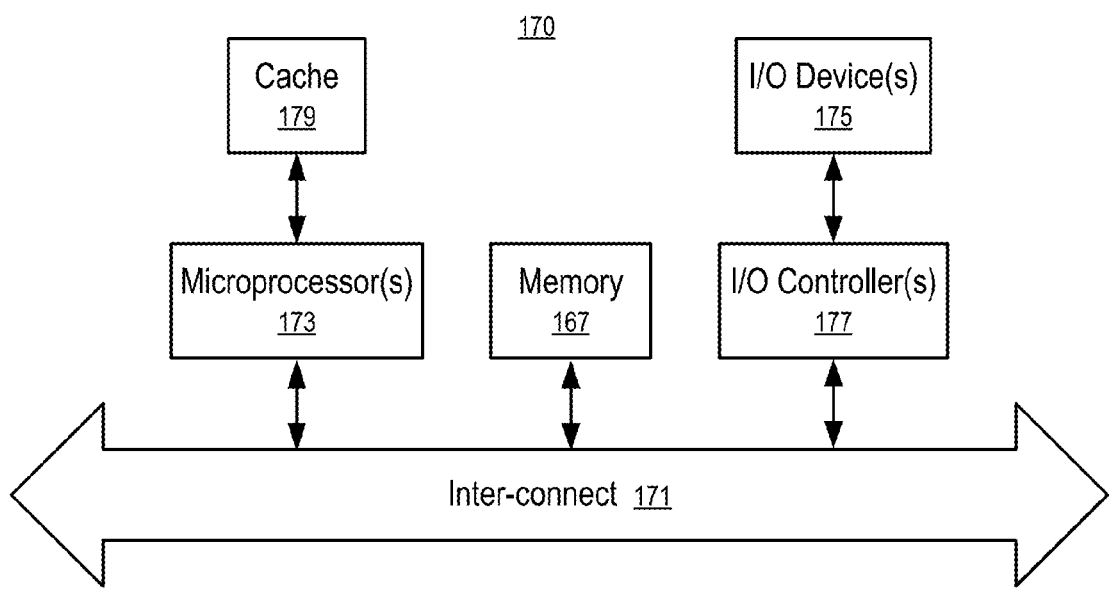
FIG. 7 illustrates a data processing system according to one embodiment.

FIGS. 5 and 6 illustrate examples of transaction terminals (105) and account identification devices (141). FIG. 7 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 1, 4-7, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

When the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010, assigned U.S. Pat. App. Pub. No. 2010/0280882, and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned U.S. Pat. App. Pub. No. 2008/0319843, and entitled "Supply of Requested Offer Based on Point-of Service to Offeree Distance," U.S. patent application Ser. No. 11/755,575, filed May 30, 2007, assigned U.S. Pat. App. Pub. No. 2008/0300973, and entitled "Supply of Requested Offer Based on Offeree Transaction History," U.S. patent application Ser. No. 11/855,042, filed Sep. 13, 2007, assigned U.S. Pat. App. Pub. No. 2009/0076896, and entitled "Merchant Supplied Offer to a Consumer within a Predetermined Distance," U.S. patent application Ser. No. 11/855,069, filed Sep. 13, 2007, assigned U.S. Pat. App. Pub. No. 2009/0076925, and entitled "Offeree Requested Offer Based on Point-of Service to Offeree Distance," and U.S. patent application Ser. No. 12/428,302, filed Apr. 22, 2009, assigned U.S. Pat. App. Pub. No. 2010/0274627, and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned U.S. Pat. App. Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862,487, filed Sep. 27, 2007, assigned U.S. Pat. App. Pub. No. 2008/0082418, and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185,332, filed Aug. 4, 2008, assigned U.S. Pat. App. Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010, assigned U.S. Pat. App. Pub. No. 2011/0035280, and entitled "Systems and Methods for Targeted Advertisement Delivery," the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

In one embodiment, the portal (143) is configured to identify the consumer account (146) based on the IP address identified in the user data (125) through mapping the IP address to a street address.

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010, assigned U.S. Pat. App. Pub. No. 2011/0093327, and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

The correlator (117) is configured in one embodiment to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010, assigned U.S. Pat. App. Pub. No. 2011/0035278, and entitled "Systems and Methods for Closing the Loop between Online Activities and Offline Purchases," the disclosure of which application is incorporated herein by reference.

Loyalty Program

In one embodiment, the transaction handler (103) uses the account data (111) to store information for third party loyalty programs.

Figure 8:
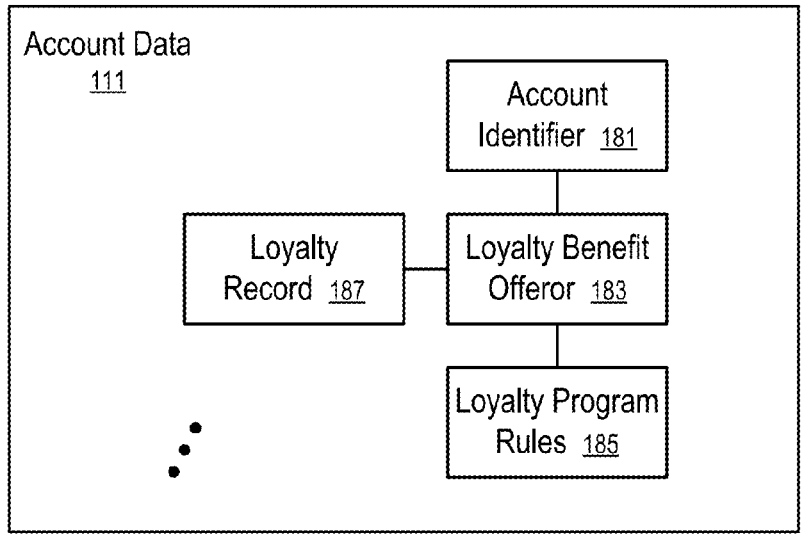
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs. The third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), as if the account identifier (181) were used to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

In one embodiment, when the user (101) uses the account identifier (181) to make purchases as a member, the merchant may further provide information about the purchases; and the transaction handler (103) can store the information about the purchases as part of the loyalty record (187). The information about the purchases may identify specific items or services purchased by the member. For example, the merchant may provide the transaction handler (103) with purchase details at stock-keeping unit (SKU) level, which are then stored as part of the loyalty record (187). The loyalty benefit offeror (183) may use the purchase details to study the purchase behavior of the user (101); and the profile generator (121) may use the SKU level purchase details to enhance the transaction profiles (127).

In one embodiment, the SKU level purchase details are requested from the merchants or retailers via authorization responses, when the account (146) of the user (101) is enrolled in a loyalty program that allows the transaction handler (103) (and/or the issuer processor (145)) to collect the purchase details.

A method to provide loyalty programs of one embodiment includes the use of the transaction handler (103) as part of a computing apparatus. The computing apparatus processes a plurality of payment card transactions. After the computing apparatus receives a request to track transactions for a loyalty program, such as the loyalty program rules (185), the computing apparatus stores and updates loyalty program information in response to transactions occurring in the loyalty program. The computing apparatus provides to a customer (e.g., 101) an offer of a benefit when the customer satisfies a condition defined in the loyalty program, such as the loyalty program rules (185). In one embodiment, the loyalty benefit as identified in the loyalty record (187) can be redeemed in connection with a transaction in a way the benefit of an offer stored in association with the account identifier (181) is redeemed.

Examples of loyalty programs through collaboration between collaborative constituents in a payment processing system, including the transaction handler (103) in one embodiment are provided in U.S. patent application Ser. No. 11/767,202, filed Jun. 22, 2007, assigned U.S. Pat. App. Pub. No. 2008/0059302, and entitled "Loyalty Program Service," U.S. patent application Ser. No. 11/848,112, filed Aug. 30, 2007, assigned U.S. Pat. App. Pub. No. 2008/0059306, and entitled "Loyalty Program Incentive Determination," and U.S. patent application Ser. No. 11/848,179, filed Aug. 30, 2007, assigned U.S. Pat. App. Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned U.S. Pat. App. Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned U.S. Pat. App. Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned U.S. Pat. App. Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned U.S. Pat. App. Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned U.S. Pat. App. Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned U.S. Pat. App. Pub. No. 2010/0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009, assigned U.S. Pat. App. Pub. No. 2010/0114686, and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010, assigned U.S. Pat. App. Pub. No. 2011/0087530, and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

In one embodiment, the SKU level purchase details are requested from the merchants or retailers via authorization responses, when the account (146) of the user (101) is enrolled in a program that allows the transaction handler (103) (and/or the issuer processor (145)) to collect the purchase details. Based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

Details on SKU-level profile in one embodiment are provided in U.S. patent application Ser. No. 12/899,144, filed Oct. 6, 2010, assigned U.S. Pat. App. Pub. No. 2011/0093335, and entitled "Systems and Methods for Advertising Services Based on an SKU-Level Profile," the disclosure of which is hereby incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 9:
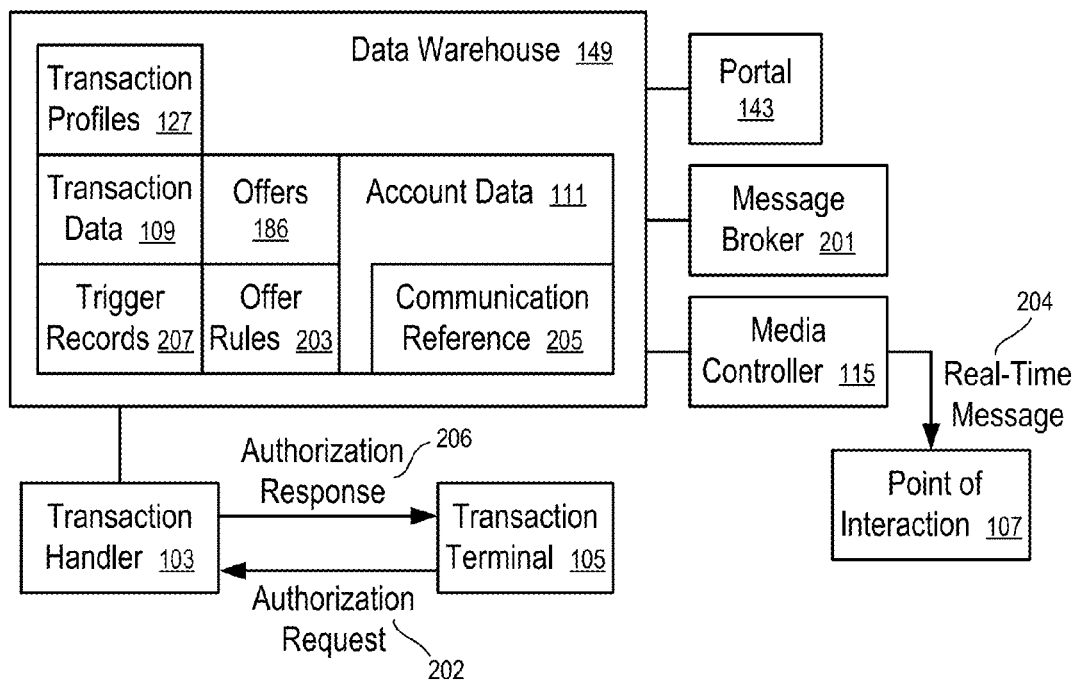
FIG. 9 shows a system to provide real-time messages according to one embodiment.

FIG. 9 shows a system to provide real-time messages according to one embodiment. In FIG. 9, the transaction handler (103) (or a separate computing system coupled with the transaction handler (103)) is to detect the occurrence of certain transactions of interest during the processing of the authorization requests received from the transaction terminal (105); a message broker (201) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal, or with a delay not long enough to cause the user (101) to have the impression that the message is in response to an action other that the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 9, the system includes a portal (143) to provide services to merchants and/or the user (101).

For example, in one embodiment, the portal (143) allows the user (101) to register the communication reference (205) in association with the account data (111), such as the account information (142) of the consumer account (146); and the media controller (115) is to use the communication reference (205) to deliver the message to the point of interaction (107). Examples of the communication reference (205) includes a mobile phone number, an email address, a user identifier of an instant messaging system, an IP address, etc.

In one embodiment, the portal (143) allows merchants and/or other parties to define rules (203) to provide offers (186) as real-time responses to authorization requests; and based on the offer rules (203), the message broker (201) is to generate, or instruct the media controller to generate, the real-time message to provide the offers (186) to the user (101). For example, the offer (186) may include a discount, an incentive, a reward, a rebate, a gift, or other benefit, which can be redeemed upon the satisfaction of certain conditions required by the offer rules (203). In one embodiment, based on the offer rules (203) the message broker (201) configures a message by selecting the appropriate message template from (an) existing message(s) template(s), and inserts any relevant data (e.g., the communication reference (205)) into the selected template, then passes the configured message to the media controller (115), which delivers the message to the point of interaction (107). In one embodiment, the message broker (201) (or a subsystem) is used to manage message templates along with the rules for selecting the appropriate message template from among several potential choices.

In one embodiment, the offer rules (203) include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules (203) are activated by the merchant or advertiser via the portal (143), the message broker (201) is to generate trigger records (207) for the transaction handler (103). The transaction handler (103) is to monitor the incoming authorization requests to identify requests that satisfy the conditions specified in the trigger records (207) during the process of the authorization requests, and to provide the information about the identified requests to the message broker (201) for the transmission of an appropriate real-time message in accordance with the offer rules (203).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile (341). In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. patent application Ser. No. 13/113,710, filed May 23, 2011, assigned U.S. Pat. App. Pub. No. 2011/0288918, and entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (201) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via cell phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (201) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (201) is to determine the identity of the merchant based on the information included in the authorization request transmitted from the transaction terminal (105) to the transaction handler (103). In one embodiment, the identity of the merchant is normalized to allow the application of the offer rules (203) that are merchant specific.

In one embodiment, the portal (143) is to provide data insight to merchants and/or advertisers. For example, the portal (143) can provide the transaction profile (127) of the user (101), audience segmentation information, etc.

In one embodiment, the portal (143) is to allow the merchants and/or advertisers to define and manage offers for their creation, fulfillment and/or delivery in messages.

In one embodiment, the portal (143) allows the merchants and/or advertisers to test, run and/or monitor the offers (186) for their creation, fulfillment and/or delivery in messages.

In one embodiment, the portal (143) is to provide reports and analytics regarding the offers (186).

In one embodiment, the portal (143) provides operation facilities, such as onboarding, contact management, certification, file management, workflow, etc. to assist the merchants and/or advertisers to complete the tasks related to the offers (186).

In one embodiment, the portal (143) allows the user (101) to opt in or opt out of the real-time message delivery service.

In one embodiment, an advertiser or merchant can select an offer fulfillment method from a list of options, such as statement credits, points, gift cards, e-certificates, third party fulfillment, etc.

In one embodiment, the merchant or advertiser is to use the "off the rack" transaction profiles (127) available in the data warehouse (149). In one embodiment, the merchant or advertiser can further edit parameters to customize the generation of the transaction profiles (127) and/or develop custom transaction profiles from scratch using the portal (143).

In one embodiment, the portal (143) provides a visualization tool to allow the user to see clusters of data based on GeoCodes, proximity, transaction volumes, spending patterns, zip codes, customers, stores, etc.

In one embodiment, the portal (143) allows the merchant or advertiser to define cells for targeting the customers in the cells based on date/time, profile attributes, map to offer/channel/creative, condition testing, etc.

In one embodiment, the portal (143) allows the merchant or advertiser to monitor the system health, such as the condition of servers, files received or sent, errors, status, etc., the throughput by date or range, by program, by campaign, or by global view, and aspects of current programs/offers/campaigns, such as offer details, package audit reports, etc. In one embodiment, reporting includes analytics and metrics, such as lift, conversion, category differentials (e.g., spending patterns, transaction volumes, peer groups), and reporting by program, campaign, cell, GeoCode, proximity, ad-hoc, auditing, etc.

Figure 10:
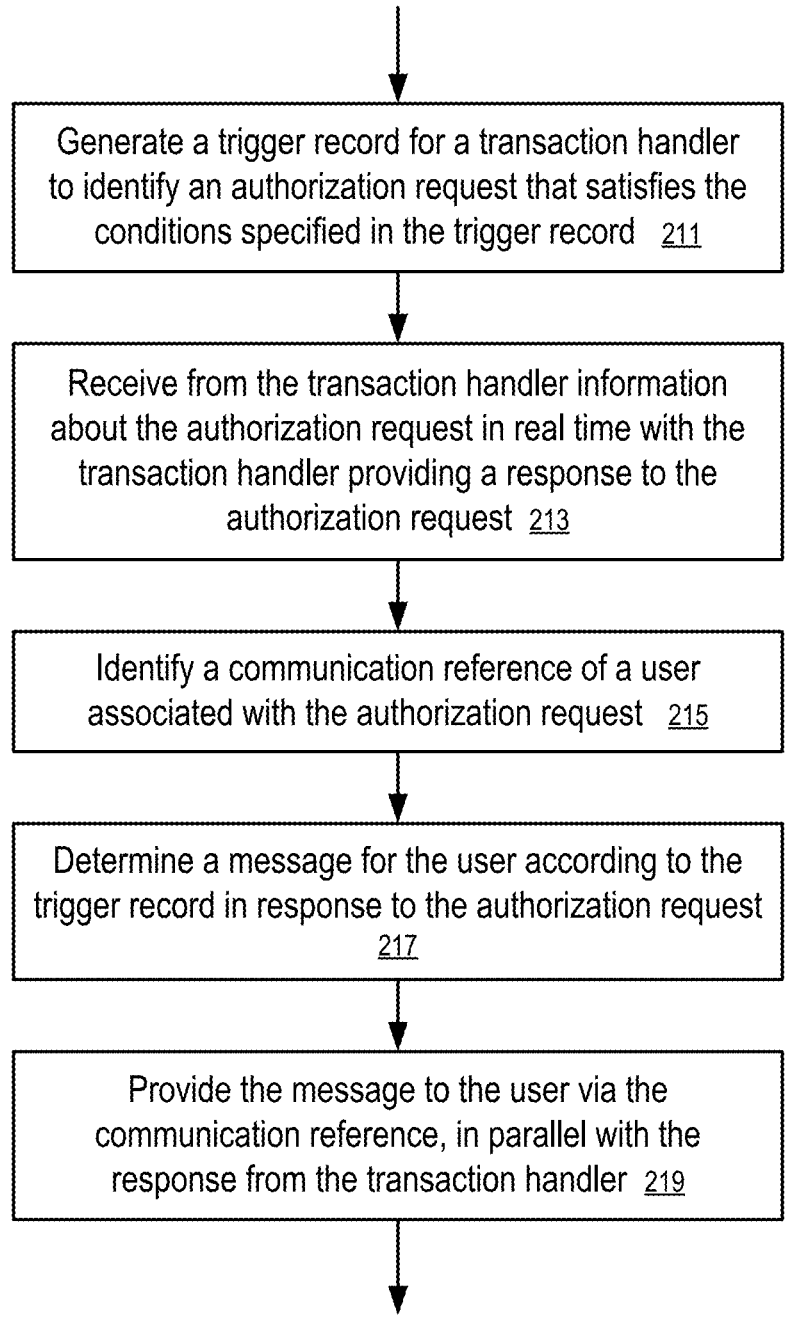
FIG. 10 shows a method to provide real-time messages according to one embodiment.

FIG. 10 shows a method to provide real-time messages according to one embodiment. In FIG. 10, a computing apparatus is to generate (211) a trigger record (207) for a transaction handler (103) to identify an authorization request that satisfies the conditions specified in the trigger record (207), receive (213) from the transaction handler (103) information about the authorization request in real-time with the transaction handler (103) providing a response to the authorization request to a transaction terminal (105), identify (215) a communication reference (205) of a user (101) associated with the authorization request, determine (217) a message for the user (101) responsive to the authorization request, and provide (219) the message to the user (101) at a point of interaction (107) via the communication reference (205), in parallel with the response from the transaction handler (103) to the transaction terminal (105).

In one embodiment, the computing apparatus includes at least one of: a transaction handler, a message broker (201), a media controller (115), a portal (143) and a data warehouse.

Selection of Locations from Route Points or Route Paths

Figure 11:
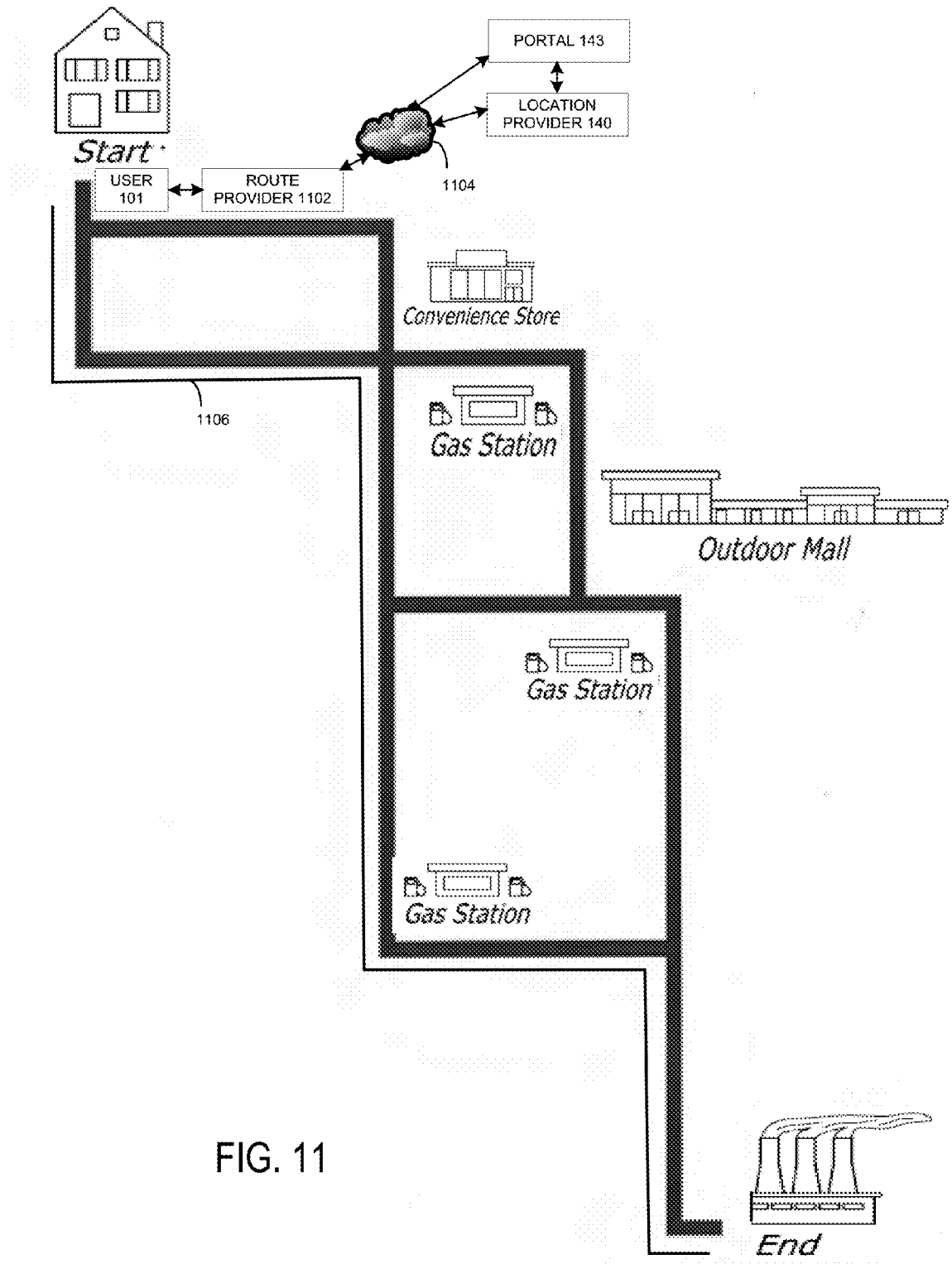
FIG. 11 shows a schematic diagram wherein a location provider interacts with a route provider associated with a user in accordance with an embodiment.

FIG. 11 shows a schematic diagram wherein a location provider (140) that interacts with a route provider (1102) associated with a user (101). In an embodiment the likely route that will be traversed by the user (101) can be predicted by a route predictor (1150) associated with the location provider (140). The route predictor (1150) can obtain information from the route provider (1102) such as an origin/start point (1108) or portion of a route traversed by the user (101) to predict the likely route of the user (101). In an embodiment, the route predictor (1150) can consult a route dictionary (not shown) associated with the user (101) in order to make the route prediction. For example, the route predictor (1150) can predict that the route (1106) will likely be taken by the user (101) based on the start point or origin (1108) and the information that the user (101) traversed the first two segments (1110) and (1112) of the route (1106).

In an embodiment, the location provider (140) obtains the information regarding a route selected (1106) for traversal by the user (101) from the route provider (1102). In an embodiment, the route provider (1102) can comprise any equipment that provides GPS data of the user, such as, a GPS device or a smartphone or a device which includes an IP address that may be mapped to the user's location. Accordingly, a route selected (1106) for traversal by the user (101) is obtained by the location provider (140) which in conjunction with data from the user specific profile (131) can predict the likely locations that are of interest (144) to the user (101) along the selected route (1106) and within a predetermined distance from the selected route (1106). In an embodiment, the locations of interest (144) can comprise retail outlets, entertainment establishments or other locations where the user (101) is likely to spend time. Consequently, real time messages associated with such locations of interest (144) can be provided to the user by the portal (143) in accordance with embodiments that will be described in further detail herein. This facilitates the portal (143) to provide location-based services such as, real-time messages related to deals, coupons or other alerts to the user (101) that are tailored to the user's (101) interests.

Figure 12A:
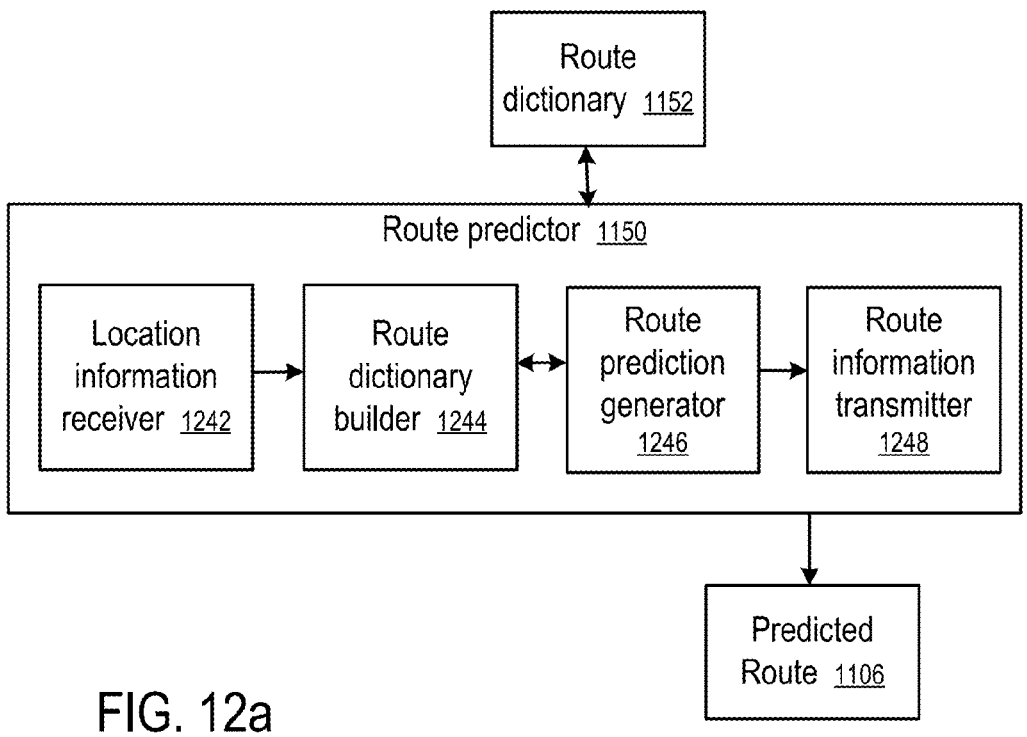
FIG. 12a shows a schematic diagram of a route predictor in accordance with an embodiment.

FIG. 12a shows a schematic diagram of a route predictor (1150) in accordance with an embodiment. The route predictor (1150) is configured to predict a route (1106) that a user (101) will likely employ and communicate the predicted route (1106) to the portal (143). In an embodiment, the route predictor (1150) includes a location information receiver (1242), a route dictionary builder (1244), a route prediction generator (1246) and a location information transmitter (1248). The location information receiver (1242) is configured to receive location information of consumers associated with the consumer accounts. In an embodiment, the location information receiver (1242) can receive the GPS information or other network information, indicative of location of the consumers. In one embodiment, a consumer or a user (101) can be solicited to provide access to their current location information in order to receive location-based services. For example, when a user (101) consents to collection of his or her current location information, the user (101) can be requested to provide their mobile number or other information that can aid collection of current location information. This enables obtaining current location information from the consumer's mobile phone and location-based services appropriate to the consumer's location and context can be provided. In an embodiment, the location information receiver (1242) can receive location information of a user's starting location (1108) and/or an initial portion (1110+1112) of the route traversed by the user (101) to facilitate generating the route prediction (1252).

The current location information collected by the location information receiver (1242) is provided to a route dictionary builder (1244) that builds and updates a database or a dictionary (1152) of a user's routes wherein each route is coded into a collection of identifiers such as, letters which form a term or a word in the route dictionary (1152). In an embodiment, the contents of the route dictionary (1152) are accessed by the route prediction generator (1246) to predict a route (1106) that is likely to be travelled by the user (101). This is facilitated by employing language processing techniques to analyze contents of the route dictionary (1152) for the route prediction (1106). In an embodiment, context data which can also be recorded in the route dictionary (1152) can be employed for the route prediction (1106). In an embodiment, context data from external sources (not shown) in conjunction with the route dictionary (1152) contents can also be employed for making route prediction. The route selected by the route prediction generator (1246) is provided to a route information transmitter (1248) which transmits the route prediction (1106) to a requestor. In an embodiment, the requestor can be the portal (143) which is configured to provide location-based services. In an embodiment, the requestor can be a third-party requestor, such as, a merchant or another intermediate entity that logs request for the route prediction.

Figure 12B:
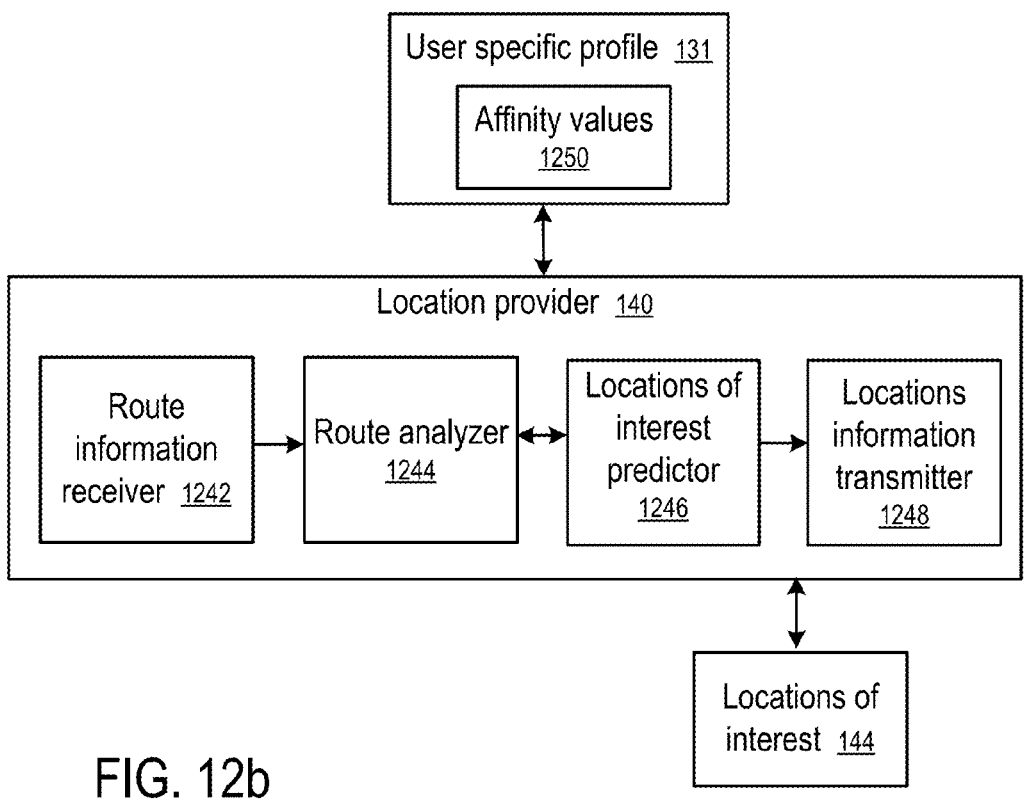
FIG. 12b shows a schematic diagram of a location provider in accordance with an embodiment.

FIG. 12b shows a schematic diagram of a location provider (140) in accordance with an embodiment. The location provider (140) is configured to determine locations (144) along the route (1106) that will likely be of interest to the user (101) and provide information related to the locations of interest (144) to the portal (143). In an embodiment, the location provider (140) comprises a route information receiver (1272), a route analyzer (1274), a location predictor (1276) and a location information transmitter (1278). The route location information receiver (1242) is configured to receive selected route information of consumers associated with the consumer accounts. In an embodiment, the route information receiver (1272) can receive the GPS information or other network information, indicative of current location and a selected route of the consumers. In one embodiment, a consumer or a user (101) can be solicited to provide access to their current location information in order to receive location-based services. For example, when a user (101) consents to collection of his or her current location information, the user (101) can be requested to provide their mobile number or other information that can aid collection of the current location information. This enables obtaining the current location and a selected route (1106) or predicting that the route (1106) will likely be selected from data provided by the consumer's or user's (101) mobile phone and location-based services appropriate to the user's location (101) and context can be provided. In an embodiment, the route information receiver (1272) can receive selected route information (1106) of the user (101) to facilitate determining the locations of interest (144) to the user (101) along the selected route (1106).

The selected route information (1106) collected by the route information receiver (1272) is provided to a route analyzer (1274) which analyzes the selected route in accordance with embodiments described herein. The results of the selected route analysis are transmitted to a locations of interest predictor (1276) which is also comprised in the location provider (140). The locations of interest predictor (1276) can additionally receive profile information (131) of the user (101) from the portal (143) and generates predictions or determines locations of interest (144) to the user (101) along the user's (101) selected route (1106).

In an embodiment, the profile information (131) of the user (101) comprises the affinity values (1250) of the user (101) for various merchants, vendors, products and/or locations. In this embodiment, a computing apparatus can perform cluster analysis in accordance with techniques know in the art to identify a plurality of standardized clusters corresponding to an area of products or services based on transactions processed by the transaction handler. In an embodiment, each of the plurality of standardized clusters corresponds to a cluster of account holders, such as user (101), that have similar spending patterns. Thus, a set of affinity values (1250) can be computed for the user (101) based on transaction data of the user (101) to indicate closeness or predilection of the user (101) to the set of standardized clusters. For example, if the user (101) buys a lot of electronics, the affinity value of the consumer for the electronics cluster and for a cluster of other users who have similar buying patterns is high. By the way of illustration and not limitation, the affinity values can be represented in as a range from 0 (representing least affinity) to 1 (representing high affinity) in accordance with an embodiment.

In an embodiment, the locations of interest (144) can be determined based not only on their distances from the route (1106) but also based on the user affinity values (1250). In accordance with embodiments described further herein, the distances of locations along the route (1106) can be further weighed with the user affinity values (1250) to derive particular utility values associated with each of the locations of interest (144), which utility values can be employed to further filter or grade the locations of interest (144) and thereby promote particular offers via real-time messaging to the user (101).

The locations information transmitter (1278) receives the information regarding the locations that are likely to be of interest to the user (101) along the selected route from the locations of interest predictor (1276) and transmits the received information to the portal (143) to aid the portal (143) in providing appropriate location based services to the user (101).

Figure 13:
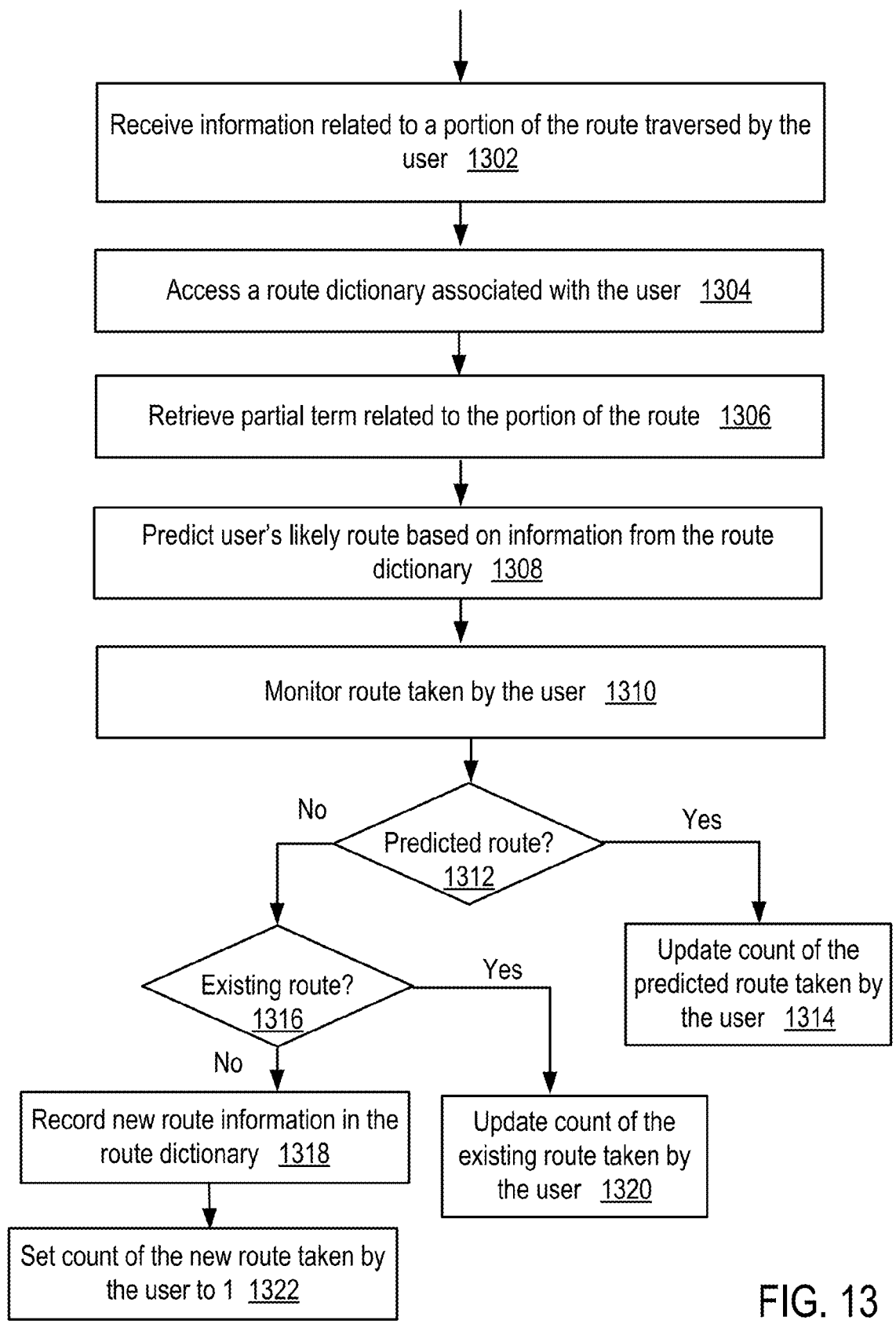
FIG. 13 shows a method of predicting a route and updating the route dictionary.

FIG. 13 shows a method of predicting a route and updating the route dictionary (1152) by a computing apparatus according to one embodiment. Initially, a portion of the route traversed by the user (101) is received (1302). A route dictionary (1152) associated with the user is accessed (1304) and a partial term that encodes the portion of the route traversed by the user is retrieved (1306). The user's (101) likely route (1106) is predicted (1308) based at least on the partial term which indicates a portion of the route already traversed by the user (101). In a further embodiment the route dictionary (1152) can be updated by observing and recording user behavior. Thus, the computing apparatus that is configured to provide route prediction (1106) can be further configured to update the route dictionary (1152) by monitoring the actual route traversed by the user (101) and recording the accuracy of the route prediction. In one embodiment, the route traversed by the user (101) is monitored (1310) by the computing apparatus. In an embodiment, the computing apparatus updates the route dictionary (1152) with the route taken by the user (101) at a later time according to the procedure detailed herein. The computing apparatus determines (1312) if the user (101) employed the predicted route (1106). If it is determined that the user (101) employed the predicted route (1106), the count of the predicted route (1106) is updated (1314). If it is determined that the user (101) did not employ the predicted route (1106), then a determination is further made (1316) if the user (101) traversed a route already recorded or currently existing in the route dictionary (1152). If the route traversed by the user already exists in the route dictionary (1152), the count of the existing route is updated (1320). If the route taken by the user (101) does not exist in the route dictionary (1152), the new route information is recorded (1318) in the route dictionary (1152) with the frequency count set to 1 (1322). Subsequently, as the user (101) employs the newly recorded route, its frequency count in the route dictionary (1152) can be updated accordingly. In an embodiment, if a route is not used for longer than a preset threshold time, the route can be deleted from the route dictionary (1152) thereby optimizing usage of resources and the route prediction process. The computing apparatus can therefore be configured to not only predict routes but also to observe the accuracy of route predictions and learn from them so that the accuracy of the route predictions can be increased with increasing observations regarding user behavior.

Figure 14A:
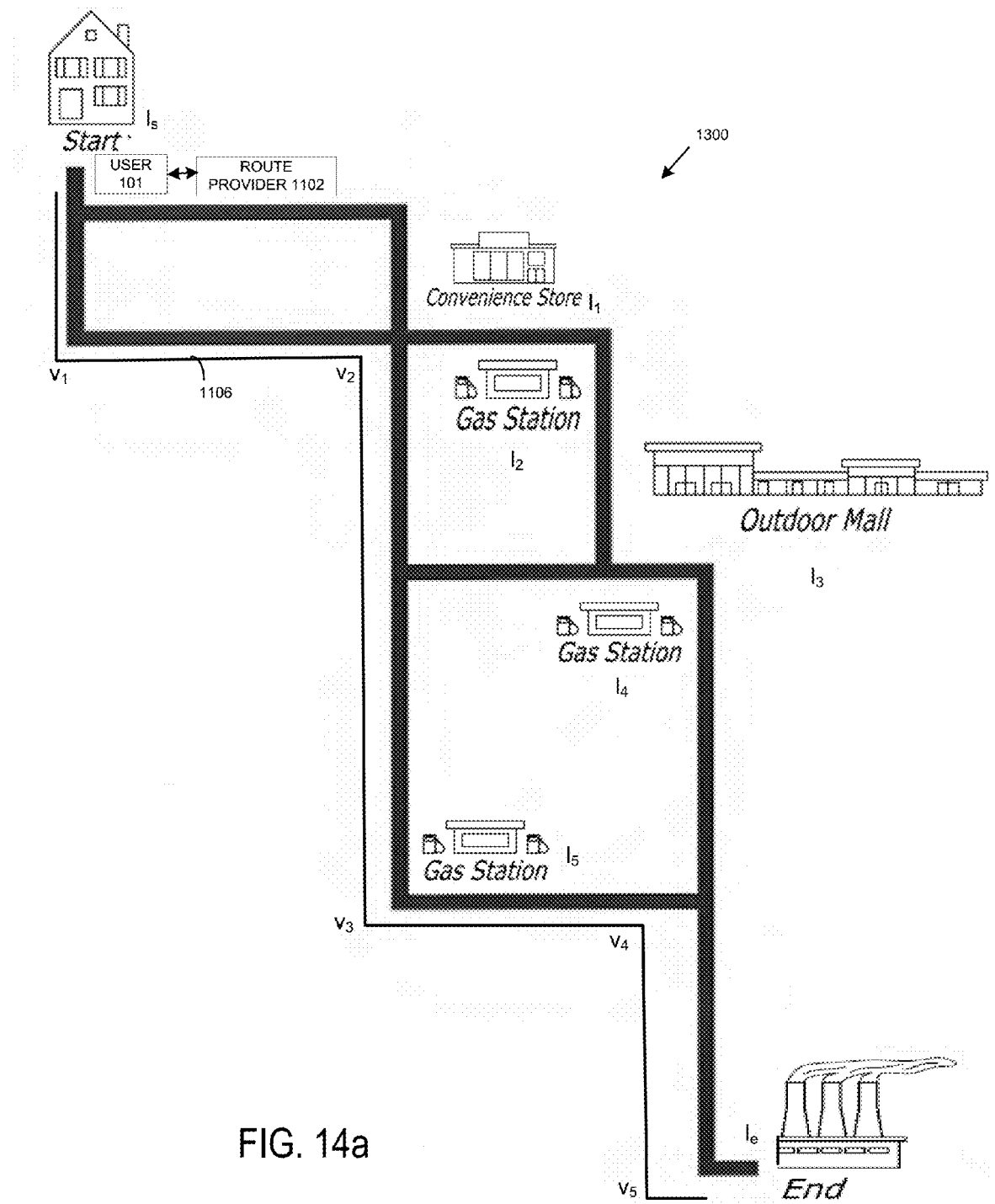
FIG. 14a is a map showing various routes to frequent destinations of a user who employs a routing device or a route provider.

FIG. 14a is a map 1300 showing various routes to frequent destinations of a user (101) who employs a routing device or a route provider (1102) wherein a route (1106) is selected for traversal by the user (101) or is predicted as the likely route of the user (101). The information regarding the route (1106) is obtained by the location provider (140) either directly from the route provider (1102) or via the portal (143). The selected route (1106) is analyzed by the route analyzer (1244) and each intersection of two routes or points at which the user (101) changes direction of travel while travelling along the selected route (1106) is encoded as a vertex by a computing apparatus executing the location provider (140). Therefore, five vertices, v1 below the start point, v2 next to the convenience store, v3 next to the gas station, v4 at the intersection of the route from the gas station to the route leading to the end point at the factory and v5 near the end point are identified by the route analyzer (1244) along the route (1106). In addition, six locations ls, l1, l2, l3, l4, l5 and le along the route (1106) including the starting location or origin ls and ending location or destination le are identified by the route analyzer (1244) which further analyzes the route (1106) in accordance with embodiments detailed further herein.

Figure 14B:
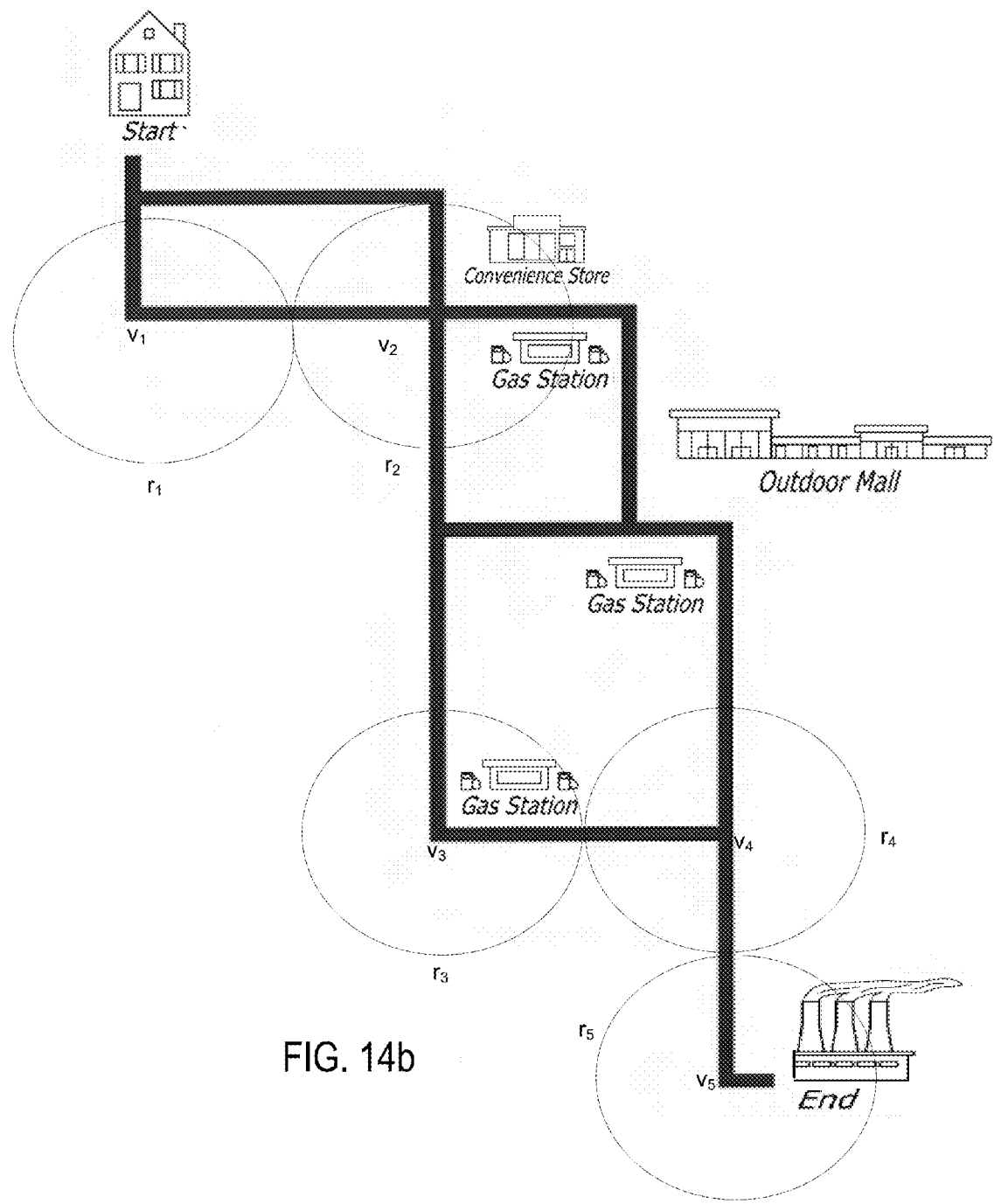
FIG. 14b is an illustration showing further analysis of the route by the route analyzer.

FIG. 14b is an illustration showing further analysis of the route (1106) by the route analyzer (1244). It may be appreciated that while the maps illustrated in the drawings and described herein can be drawn or analyzed to scale, which scale may be different for different routes based on, for example, the parameters of the route (1106) such as length of the route, number of locations on the route and the like. In particular, FIG. 14b illustrates the concept of radii of map vertices wherein five circles are drawn with the vertices v1, v2, v3, v4 and v5 as centers and respective radii r1, r2, r3, r4 and r5. Each radius is determined so that each of the circles at one of the vertices will have at least one point of contact with the adjacent circles drawn around the neighboring vertices. For example, the circle drawn at vertex v4 and radius r5 has one point of contact with a neighboring circle drawn at v3 and two points of contact with the circle drawn at v5.

Figure 15:
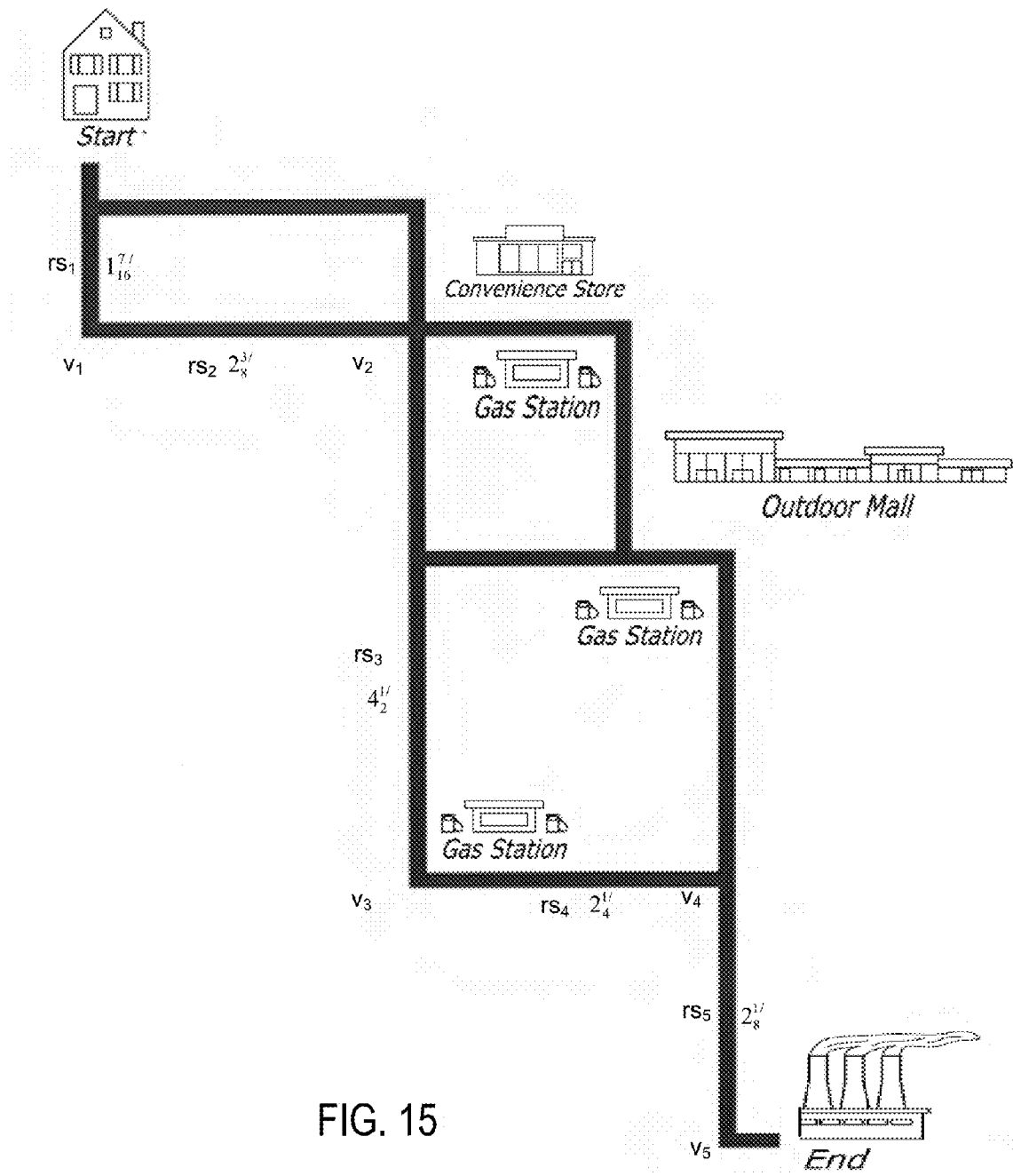
FIG. 15 is another illustration showing further analysis of the selected route (1302) by the route analyzer according to one embodiment.

FIG. 15 is another illustration showing further analysis of the route (1106) by the route analyzer (1244) wherein the segment distances between route vertices are measured. The distance rs1 between the starting point and vertex v1 is 17/16 units, the distance rs2 between the vertex v1 and vertex v2 is 23/8 units, the distance rs3 between the vertex v2 and the vertex v3 is 41/2 units, the distance rs4 between the vertex v3 and vertex v4 is 21/4 units, the distance rs5 between the vertex v4 and vertex v5 is 21/8 units, and the distance rse between the vertex v5 and the vertex at the end is 7/8 units.

Figure 16:
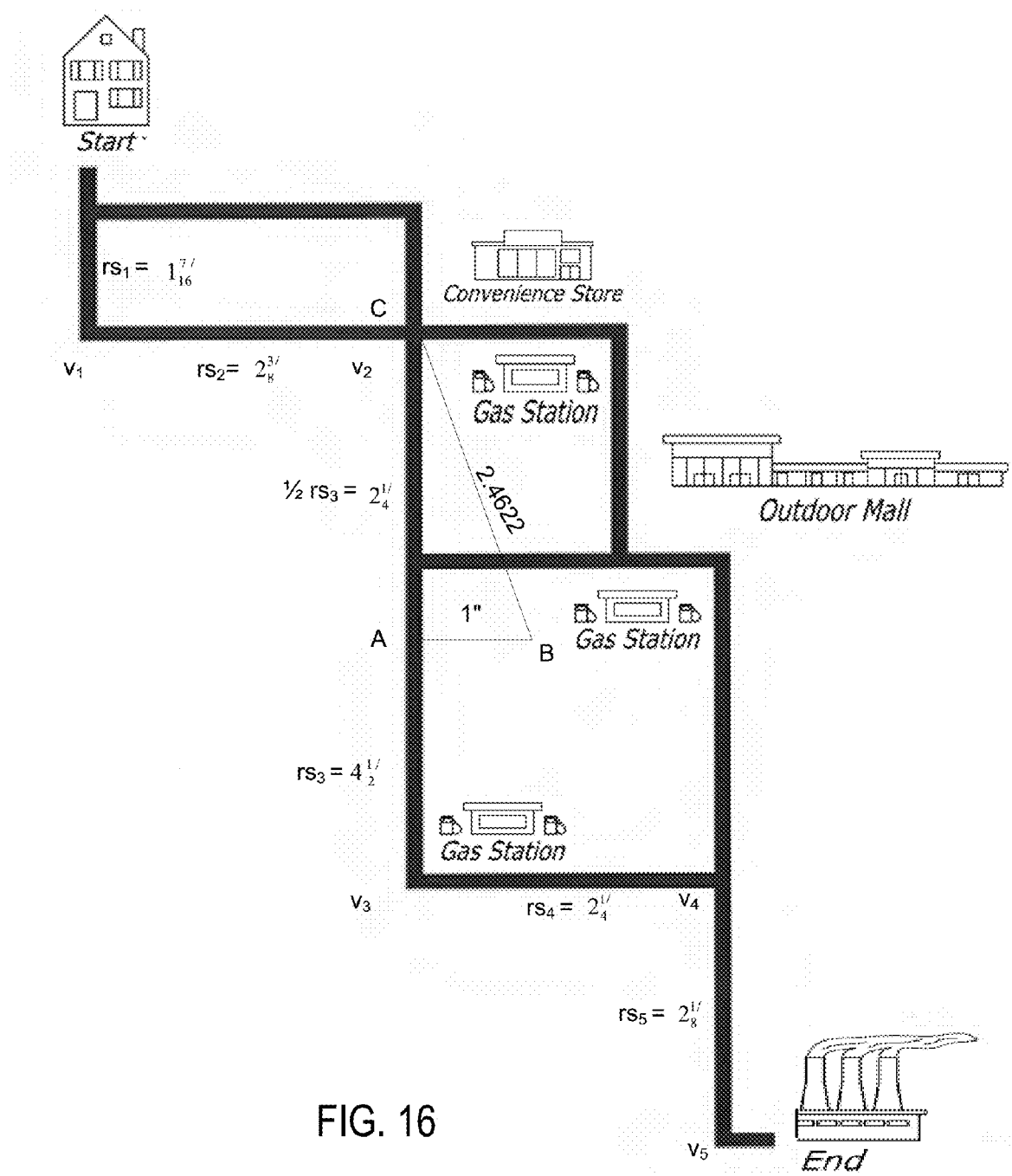
FIG. 16 shows a map wherein radii of map vertices are weighed to ensure that the entire area that falls within a predetermined route threshold according to one embodiment.

FIG. 16 shows a map wherein radii of map vertices are weighed to ensure that the entire area that falls within 1 inch of the route (1106) is covered for further route analysis. In particular, FIG. 16 shows the calculation of weighed radius for a segment of the route (1106) between the vertices v2 and v3 is selected as it is the longest segment having a length of 41/4 units. The weighed radius for the selected segment between vertices v2 and v3 is 2.4622 units. By the way of illustration and not limitation, a weighted radius wr for two vertices vx and vy is calculated using the formula:

$$wr_{vxvy} = [(rs_{xy}/2)^2 + rt^2]^{1/2} \qquad \text{Eq. (1)}$$

The weighted radius wrvxvy in accordance with this embodiment is the hypotenuse of a right triangle with sides a=lrs3/2 and b=route threshold (which is 1 inch for the values shown in FIG. 15).

Figure 17:
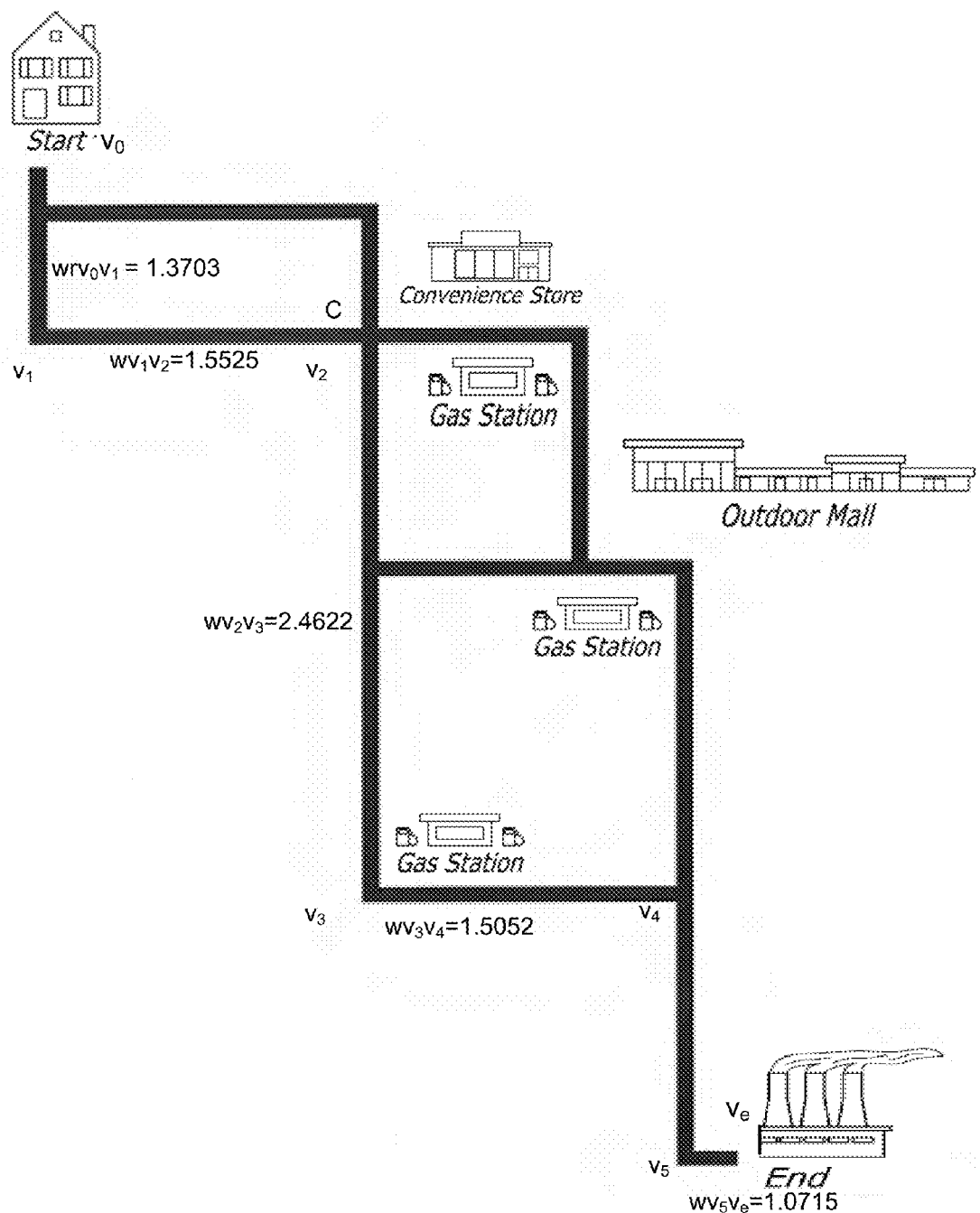
FIG. 17 illustrates the values of the weighted radius for each of the segments between the vertices of the selected route calculated according to one embodiment.

FIG. 17 illustrates the values of the weighted radius for each of the segments between the vertices of the route (1106) calculated in accordance with an embodiment of the present disclosure. In an embodiment, it is estimated using Eq. (1) discussed above. The value of the weighted radius wrv 0v1 for the route segment between the starting point and vertex v1 is 1.3703 units, the weighted radius wrv1v2 for the route segment between the vertices v1 and v2 is 1.5525 units, the value of the weighted radius wrv2v3 for the route segment between the vertex v2 and the vertex v3 is 2.4622 units, the value of the weighted radius wrv3v4 between the vertex v3 and vertex v4 is 1.5052 units, the value of the weighted radius wrv5ve between vertex v5 and the vertex at the end is 1.0915 units.

Figure 18:
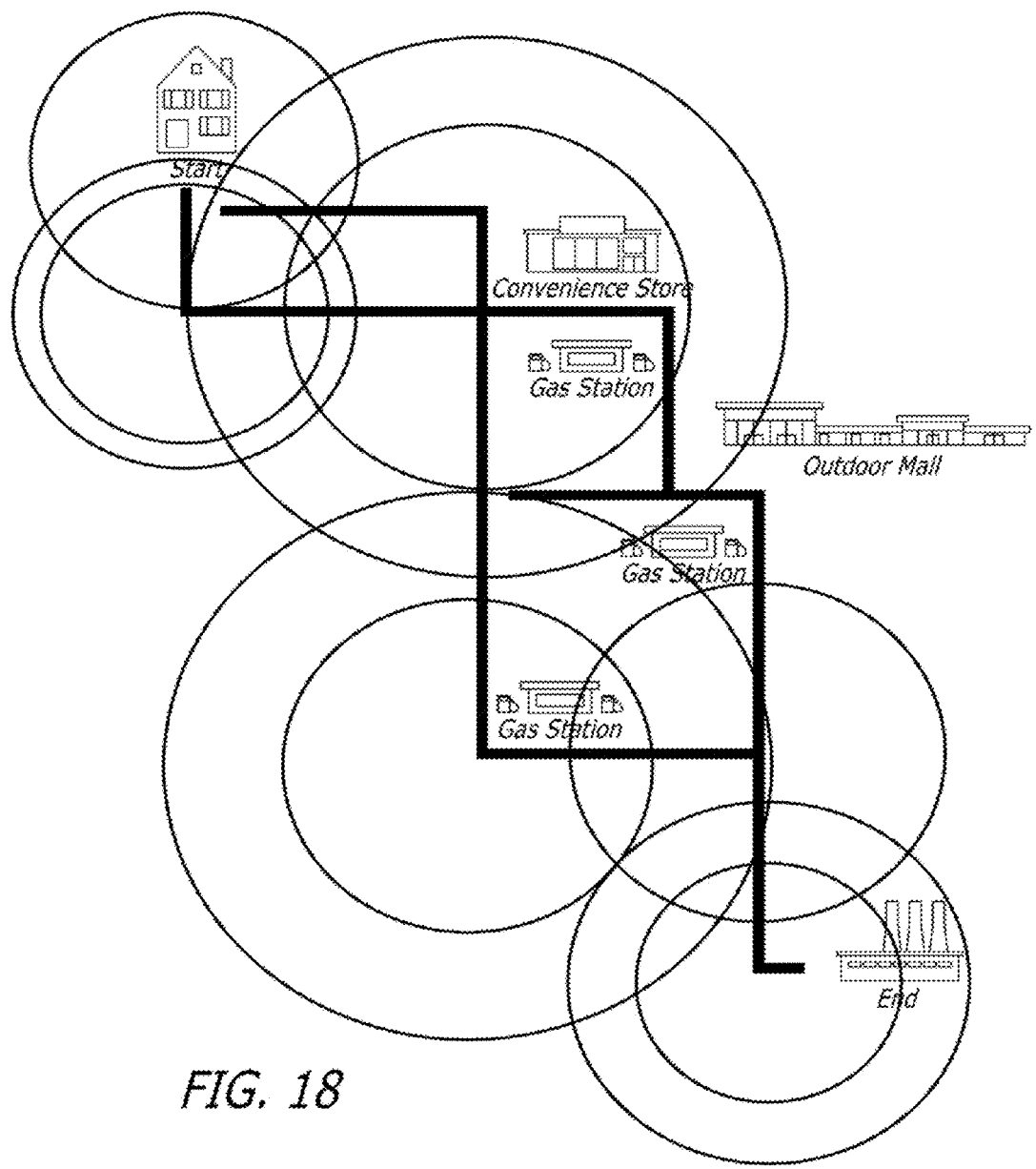
FIG. 18 illustrates further analysis of the selected route wherein two circles are drawn for each of the route vertices according to one embodiment.

FIG. 18 illustrates further analysis of the route (1106) wherein two circles are drawn for each of the route vertices v1, v2, v3, v4, and v5. Each of the two circles centered at a route vertex has one of the two weighted radii as a radius of the circle. Thus, for example, for the vertex v1 a first circle is drawn with v1 as the center with a radius of wrv0v1 equal to 1.3703 units and a second circle can be drawn with v1 as the center with a radius of wrv1 v2 equal to 1.5525 units. For vertex v2 a first circle is drawn with v2 as the center with a radius of wrv1 v2 and a second circle can be drawn with v2 as the center with a radius of wrv2v3. For vertex v3 a first circle is drawn with v3 as the center with a radius of wrv2v3 and a second circle can be drawn with v2 as the center with a radius of wrv3v4. For vertex v4 a first circle is drawn with v4 as the center with a radius of wrv3v4 and a second circle can be drawn with v4 as the center with a radius of wrv4v5. For vertex v5 a first circle is drawn with v5 as the center with a radius of wrv4v5 and a second circle can be drawn with v5 as the center with a radius of wrv5ve. It may be noted that for the vertices vs and ve located respectively at the starting and the ending locations, only one circle is obtained since only one weighted radius is associated with each of these two vertices.

Figure 19:
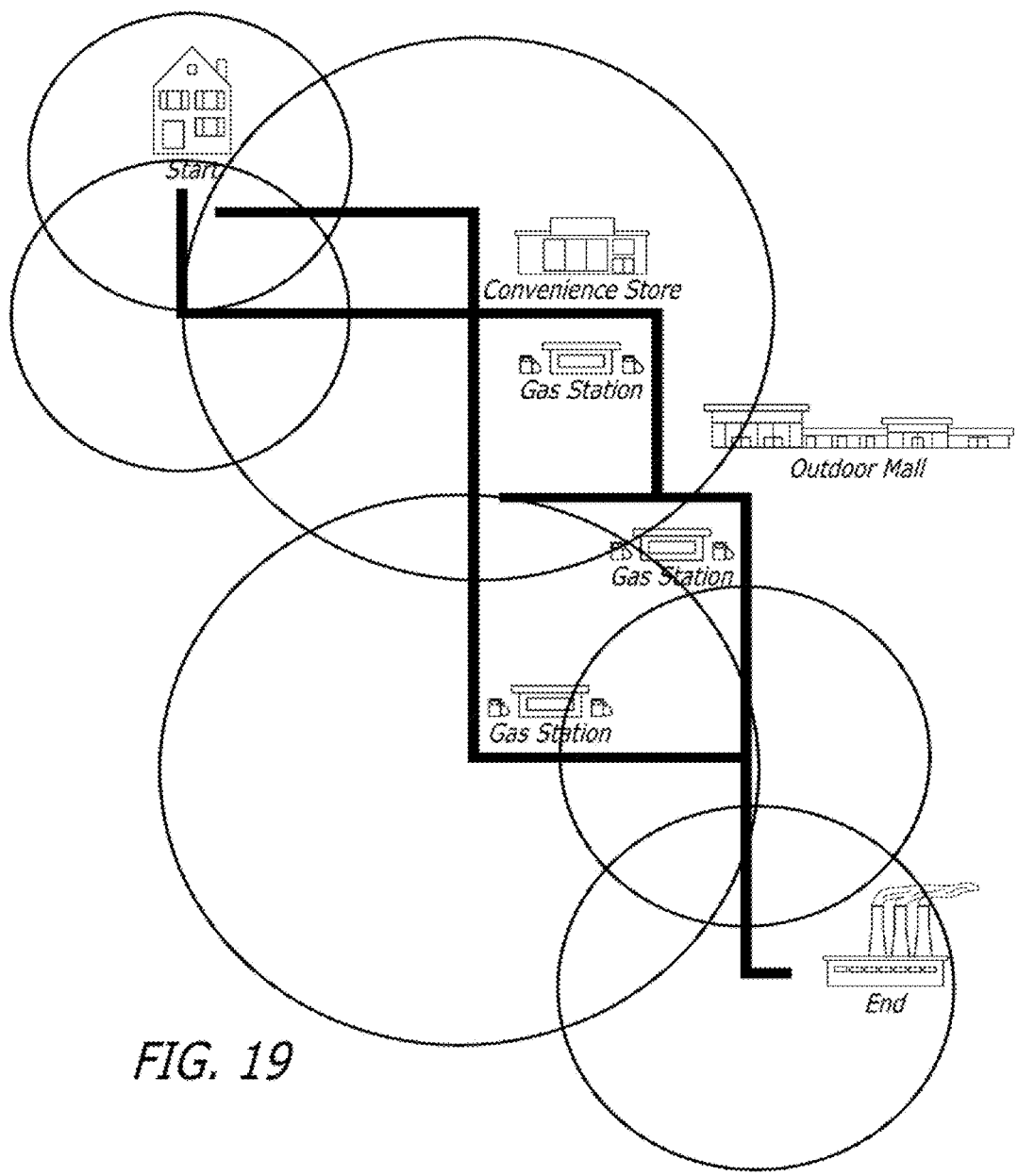
FIG. 19 illustrates further analysis of the selected route wherein area surrounding the selected route based on the maximum weighted radii from the vertices is obtained in accordance with an embodiment of the present disclosure.

FIG. 19 illustrates further analysis of the route (1106) wherein area surrounding the route (1106) based on the maximum weighted radii from the vertices is obtained. Thus, for each of the vertices v1, v2, v3, v4, and v5 having two circles associated with it, the circle with the larger radius is selected for further analysis. This can reduce the number of circles involved in the analysis while covering the same area on the map as shown in FIG. 18.

Figure 20:
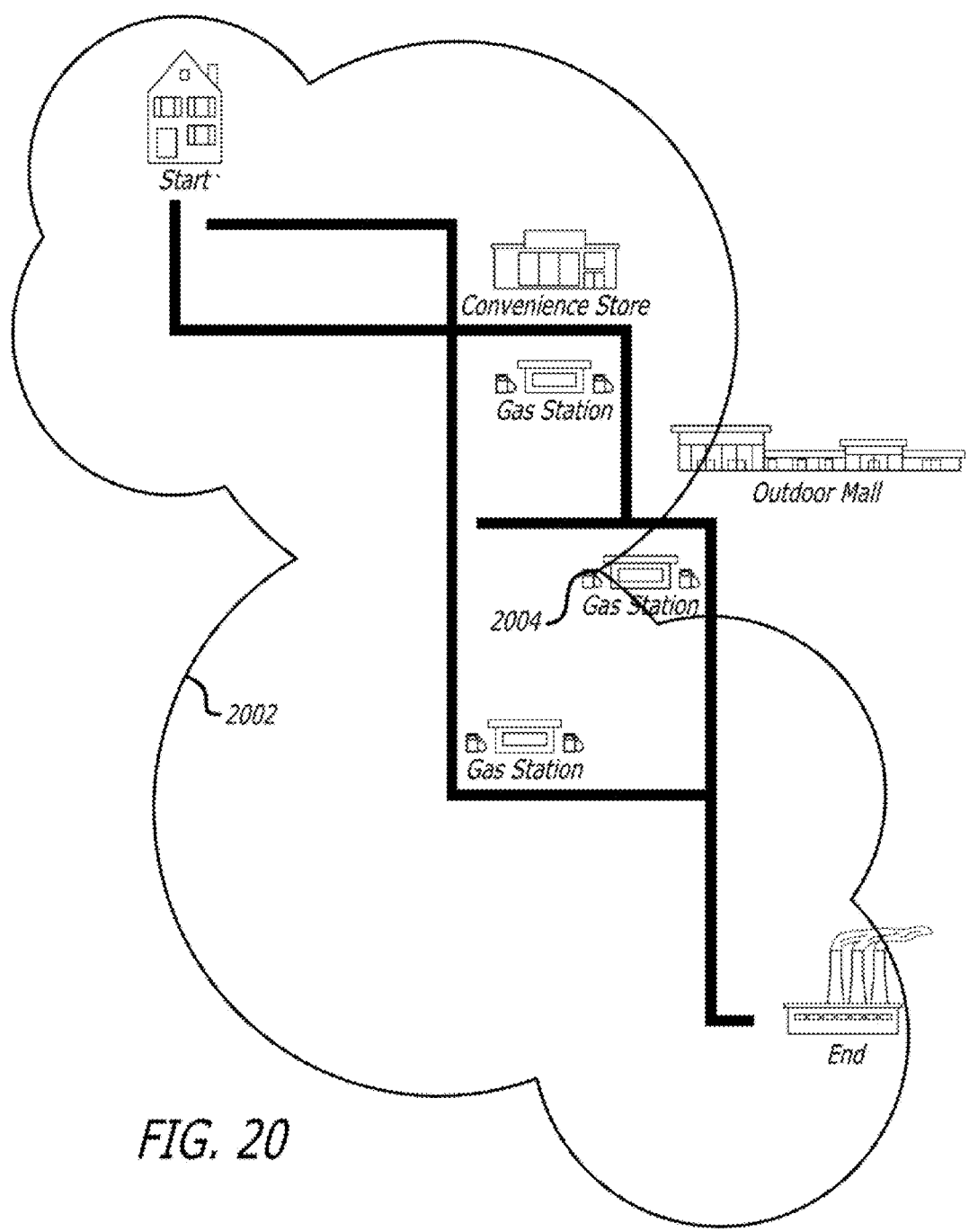
FIG. 20 illustrates the area around the route that is selected for further analysis based on the contiguous vertices method in accordance with an embodiment of the present disclosure.

FIG. 20 illustrates the area around the route (1302) that is selected for further analysis based on the contiguous vertices method in accordance with an embodiment. The area along the route (1106) less than a predetermined distance, for example, 1 inch from the route (1106) is covered by the outline 2002 and as seen at 2004, the area next to the gas station is the point that is closest to the route (1106).

Figure 21:
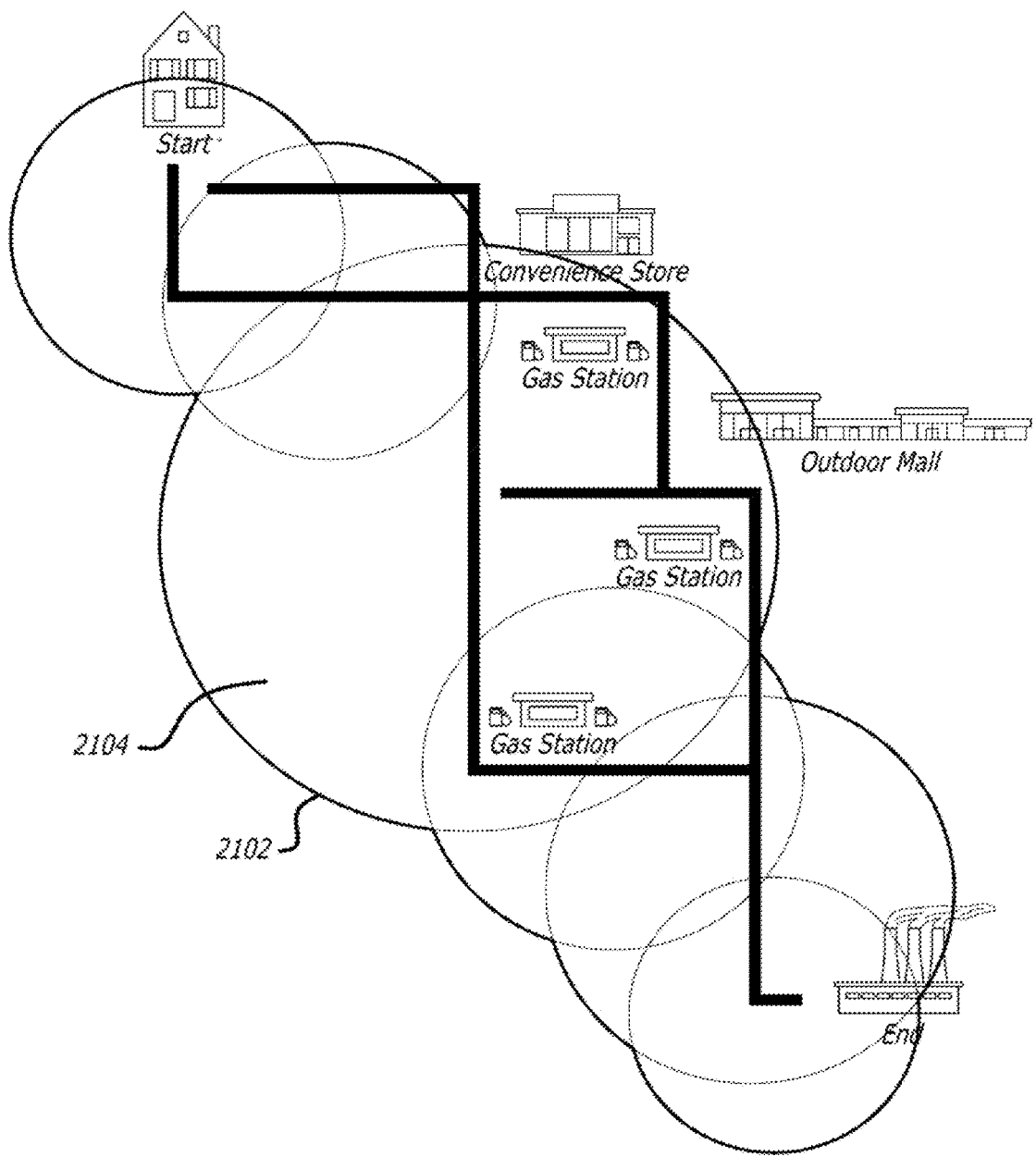
FIG. 21 illustrates the area around the route that is selected for further analysis to identify locations of interest based on weighted radii from mid points according to one embodiment.

FIG. 21 illustrates the area around the route (1302) that is selected for further analysis to identify locations of interest (144) based on weighted radii from mid points. The outline 2102 that shows the selected area 2104 to identify locations of interest (144). The outline 2102 is obtained by drawing a circle at each mid-point of each of the segments of the route (1106) extending between vertices vs, v1, v2, v3, v4, v5 and ve with radius equal to, for example, distance between the mid-point of a given route segment and one of the vertices of the given route segment (or half of the total length of the route segment). Thus, the entire area of the map 1300 within a predetermined distance limit, for example, 1 inch of the route (1106) is covered.

Figure 22:
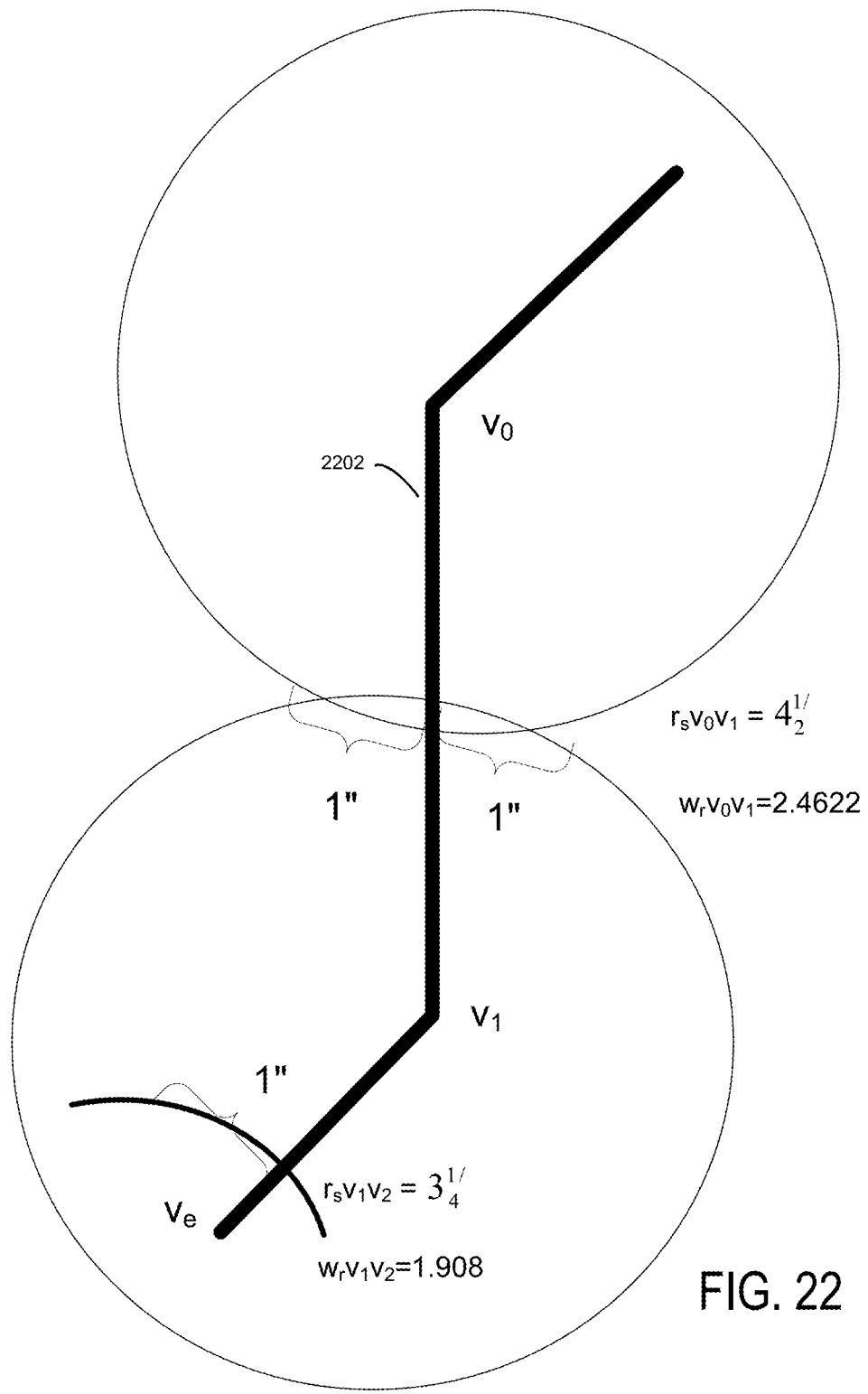
FIG. 22 illustrates an example wherein a selected route is characterized by irregular angles according to one embodiment.

FIG. 22 illustrates an example of another selected route (2202) which is characterized by irregular angles in contrast to the route (1106) that only comprises right angles or straight lines which can be special cases and are generally not a real-world scenario. The selected route (2202) comprises three vertices v1, v2, and v3 wherein the route segments intersect at irregular angles or angles other than 90 degrees or 180 degrees. For example the angle A at vertex v1 is approximately 135 degrees. The segment distance between route vertices v0 and v1 measured according to embodiments described herein is rsv0v1=41/2 units and associated weighted radius wrv0v1 calculated according to embodiments described herein is 2.4622 units. Similarly, the segment distance between route vertices v1 and v2 measured according to embodiments described herein is rsv1v2=31/4 units and associated weighted radius wrv1v2 calculated according to embodiments described herein is 1.908 units.

Figure 23:
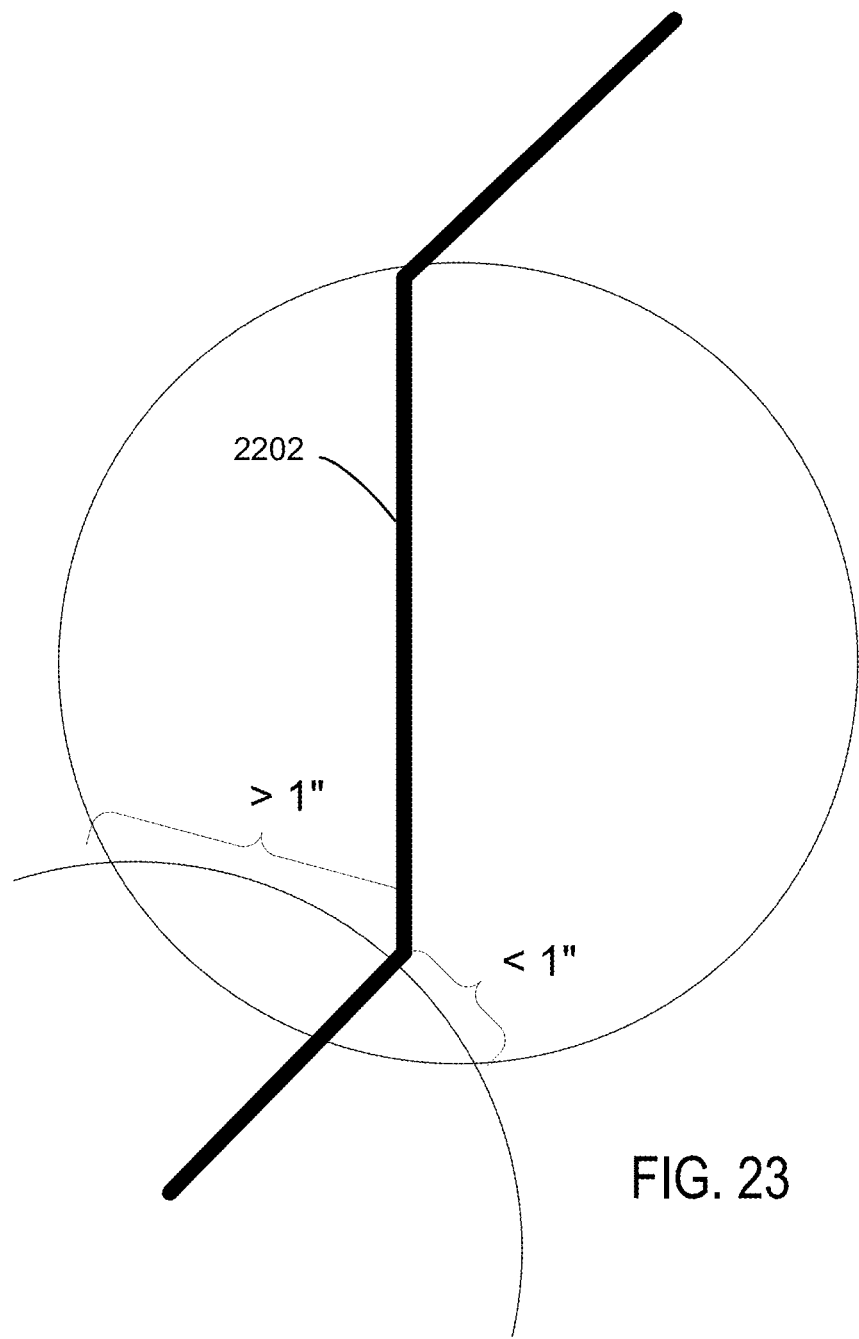
FIG. 23 illustrates an embodiment weighted radii from mid-points of route segments are used when analyzing the selected route.

FIG. 23 illustrates a scenario wherein using weighted radii from mid-points of route segments when analyzing the selected route (2202) can result in a loss of accuracy for oblique angles or angles not equal to 180 degrees. For example, as seen at vertex v1 the map area around the selected route (2200) is asymmetrically covered so that more than 1 inch (route threshold) is covered on the left side while less than 1 inch is covered on the right side of the selected route (2200).

Figure 24:
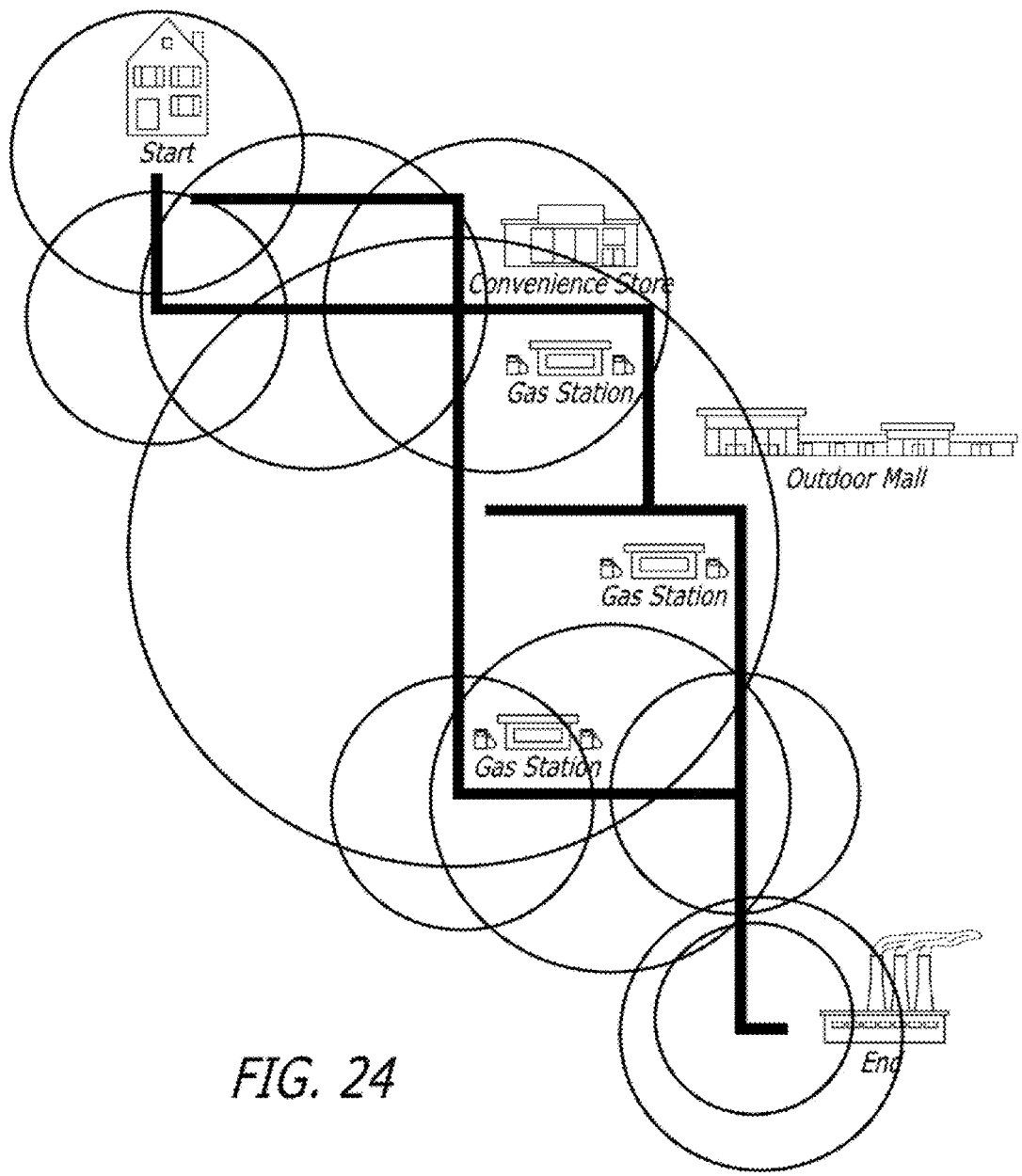
FIG. 24 shows compensating for the loss of map area coverage on one side of the selected route in accordance with embodiments described herein.

FIG. 24 illustrates an embodiment of a "joint radius" method that can be employed to correct the aforementioned loss of map area coverage on one side of the selected route (2202) due to the occurrence of an oblique angle at the vertex v1. In this embodiment, the weighted radii for mid points of route segments that intersect at oblique angles are further biased or weighed more heavily to one side of the route (2202) or vertex v1 versus the other side of the selected route (2202) or vertex v1 based on the angle at the vertex v1 that faces each particular side of the route (2202). Alternately, the weighted radius wrvxvy can be shifted from one side of the selected route (2202) to the other side of the selected route (2202).

Figure 25A:
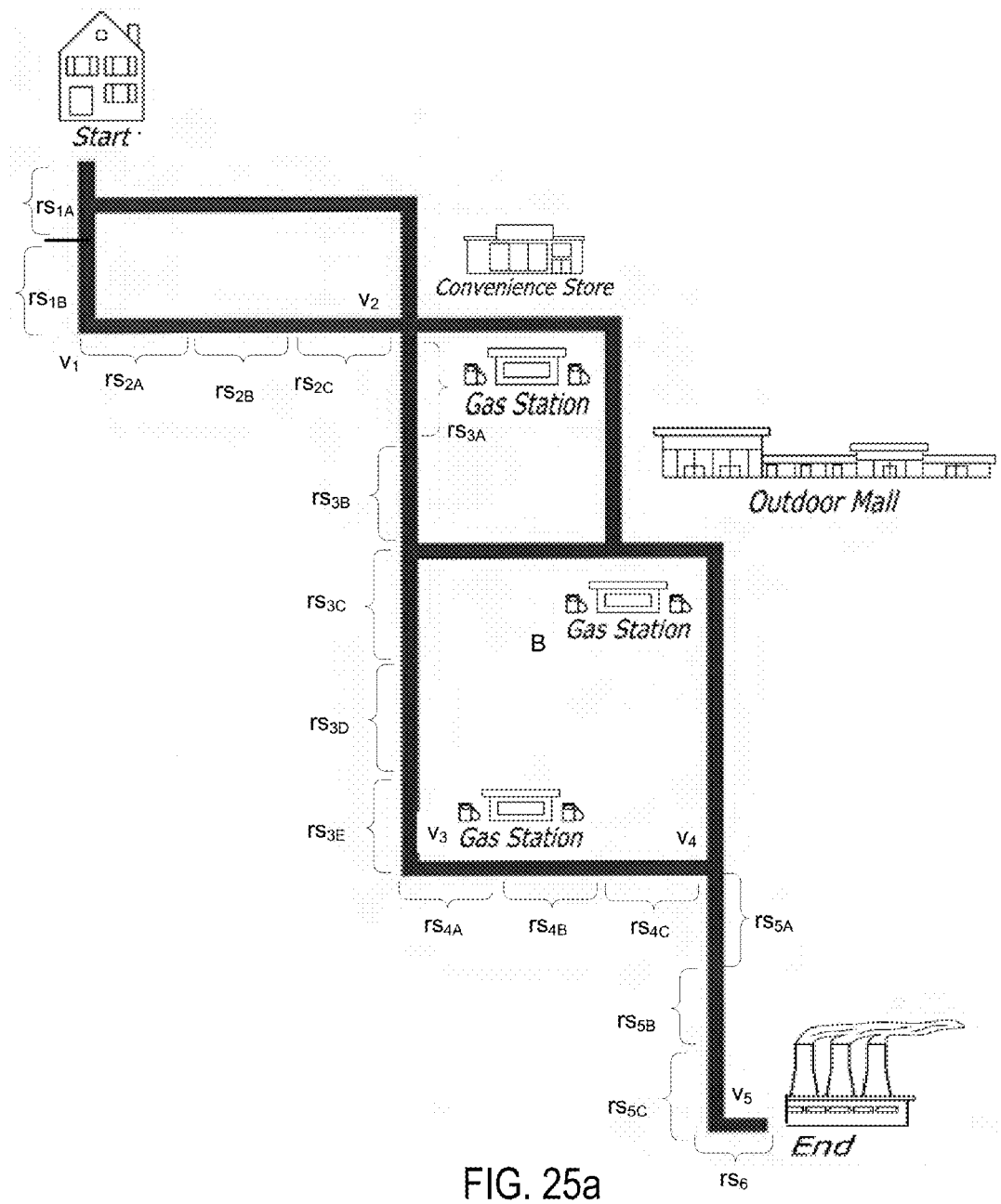
FIG. 25*a* shows one embodiment of a method to adjust the size of the radius in order to cover the map area around the selected route according to one embodiment.

FIG. 25a shows one embodiment of a method to adjust the size of the radius in order to cover the map area around the selected route (1106) within a radius equal to a route threshold (rt) which, in accordance with one embodiment, can be one inch. The method involves reducing the area to be searched for locations when it is determined that the segment size is greater than the route threshold (rt) which, in this embodiment, is one inch. Therefore, the route analyzer (1244) can have a default maximum value set for the length of the route segments as equal to the route threshold value (rt). Therefore, those route segments having lengths greater than one inch are divided into sub-segments.

Accordingly, route segment between the starting point and the vertex v1 is divided into sub-segments rs1A and rs1B. Similarly the route segment between vertices v1 and v2 is divided into rs2A and rs2B in addition to including part of the sub-segment rs2c, the route segment between vertices v2 and v3 comprises the remainder of the sub-segment rs2c, rs3A and rs3B. Similarly other segments between the vertices v3 and v4, v4 and v5, v5 and the ending location or the destination are respectively divided into sub-segments rs3C, rs3D, rs3E, rs4A, rs4B, rs4C, rs5A, rs5B, rs5C and rs6, as shown in FIG. 25a.

Figure 25B:
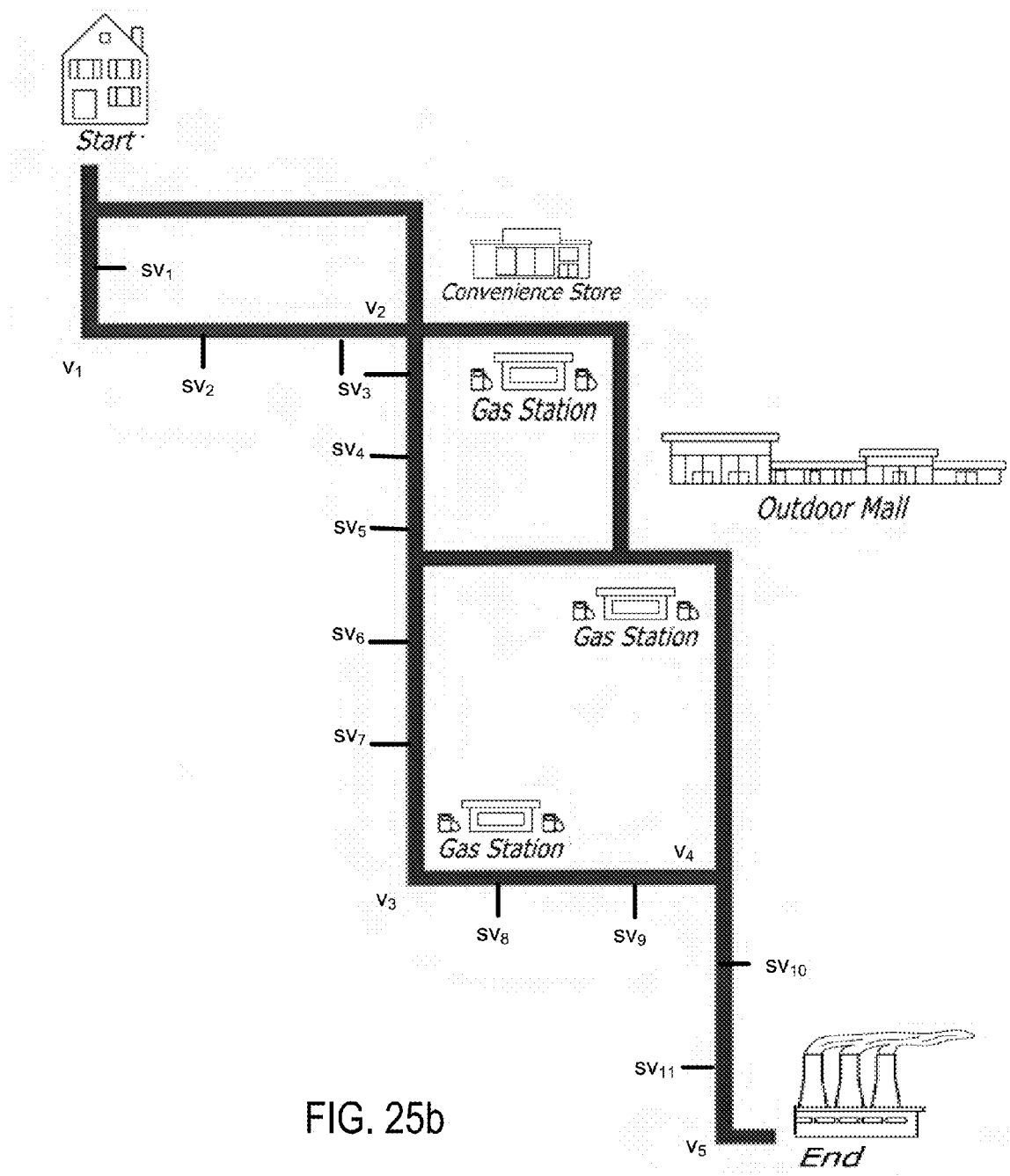
FIG. 25*b* shows one embodiment of a method to reduce search size by creating sub-segments and "sub-vertices" at each sub-segment.

FIG. 25b shows one embodiment of a method to reduce search size by creating sub-segments and "sub-vertices" at each sub-segment. As shown in FIG. 25b the end points of each sub-segment that do not coincide with one of the route vertices are identified as "sub-vertices" sv1, sv2, sv3, sv4, sv5, sv6, sv7, sv8, sv9, sv10 and sv11.

Figure 25C:
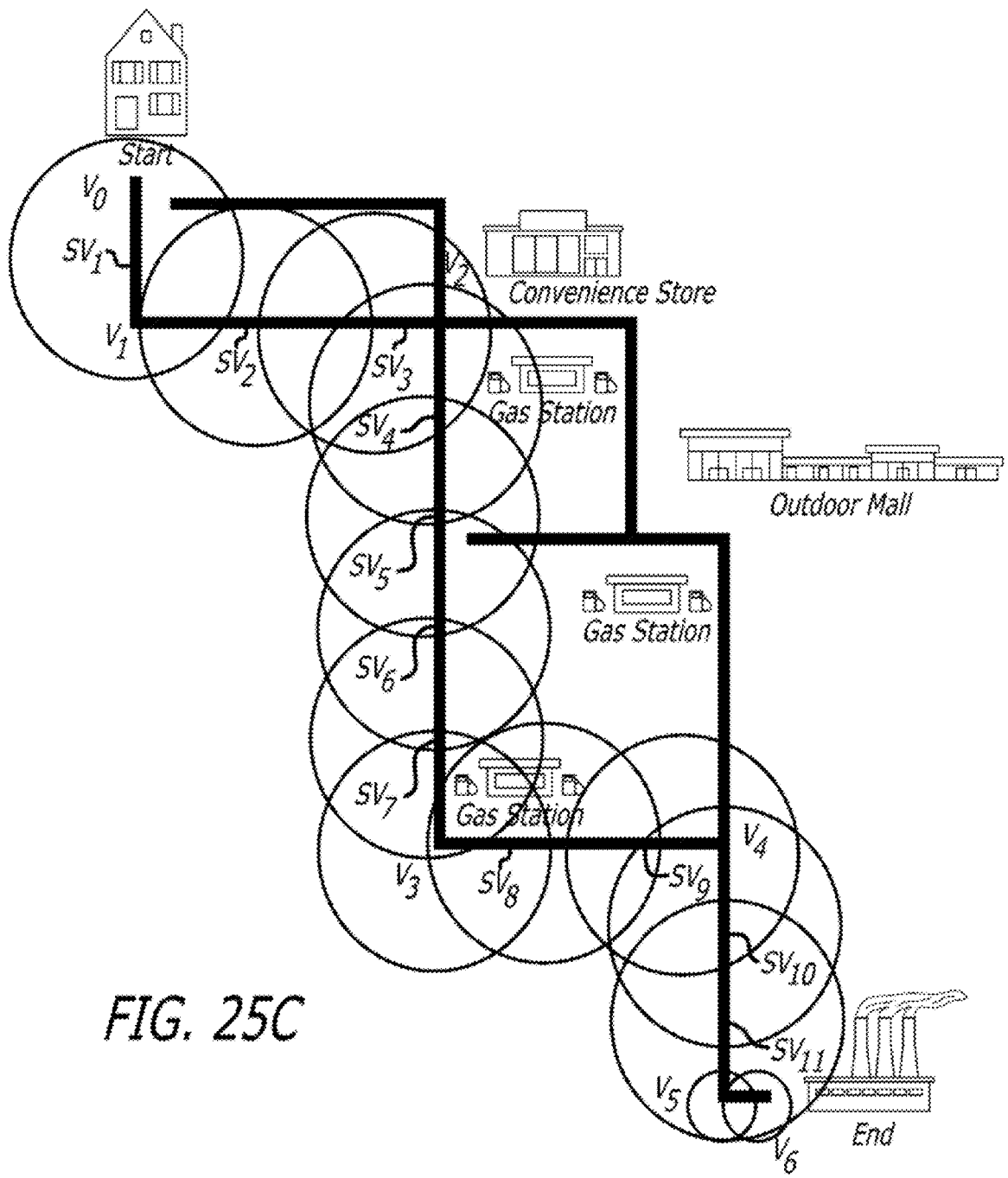
FIG. 25*c* shows one embodiment of a method to reduce search size by creating sub-segments.

FIG. 25c shows one embodiment of a method to reduce search size by creating sub-segments. For each sub-vertex, a circular area surrounding the sub-vertex and having a radius equal to the distance between the sub-vertex and one of the adjacent vertices is analyzed to identify candidates for locations of interest. Thus, the area surrounding each of the sub-vertices sv1, sv2, sv3, sv4, sv5, sv6, sv7, sv8, sv9, sv10 and sv11 that is used to find candidates for locations of interest (144) shown in FIG. 25c. As seen from FIG. 25c, the gas station (15) is included in more than one circle whereas the gas station (14) is partially included in one of the circles whereas the convenience store (11) further away from the area covered by the circle centered at sv3. Therefore, candidate locations can be ordered based on the extent of their coverage within the area that falls below the route threshold. Thus, the order of locations for associating with location based services based on their distance from the selected route (1106) is 15, 12, and 11.

FIG. 26 shows a formula 2602 that can be used to calculate a weighted radius that is based on the angle at a vertex in addition to the length of the route segment (rs) and the route threshold (rt). This is in contrast to the Eq. (1) discussed above which is only based on the length of the route segment (rs) and the route threshold (rt). As seen in FIG. 26 various values for the weighted radius (wr) are shown when the selected route (2202) is bent at different angles.

Figure 27A:
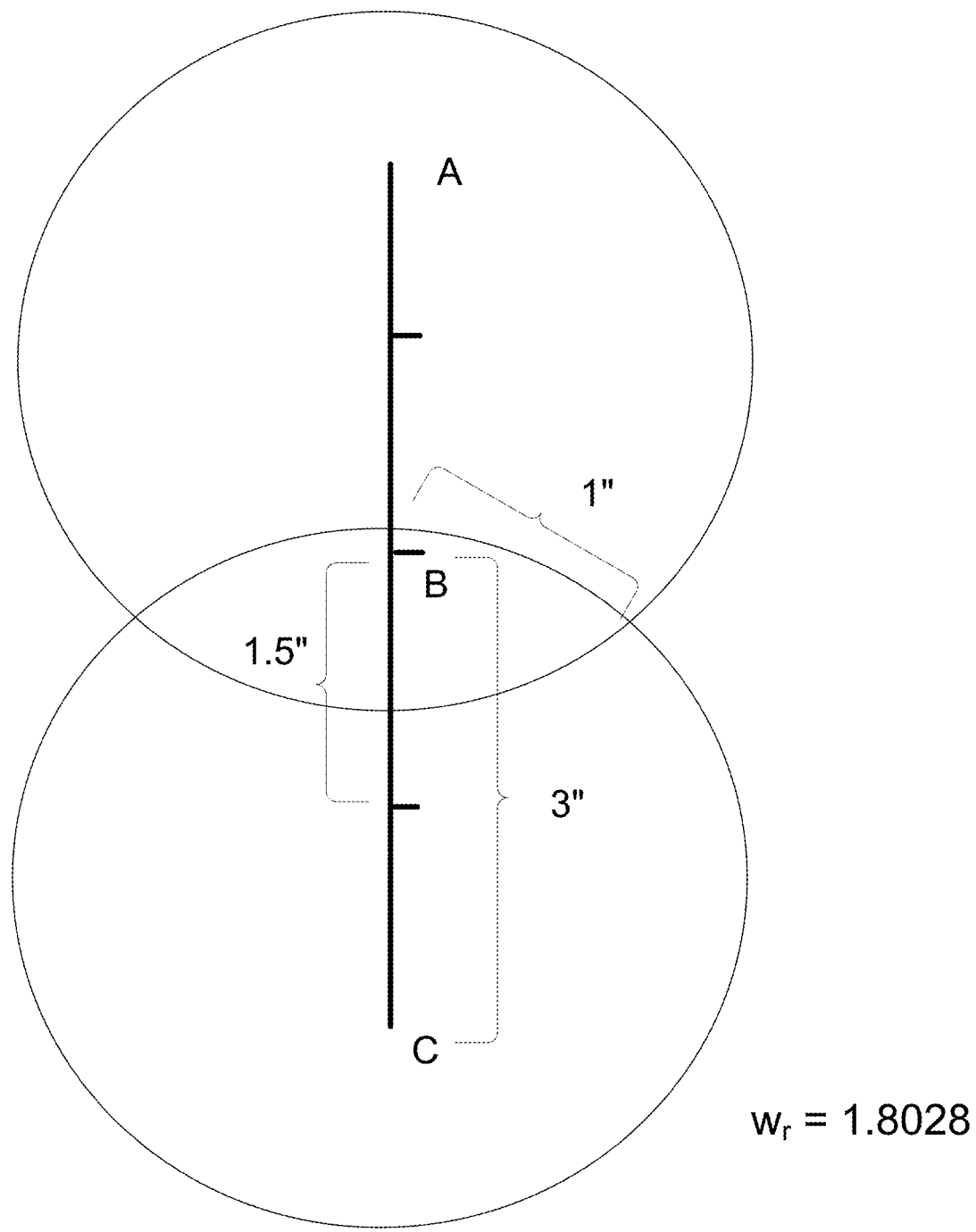
FIGS. 27*a*, 27*b*, 27*c*, 27*d* and 27*e* illustrate various possible angles for the selected route.
Figure 27B:
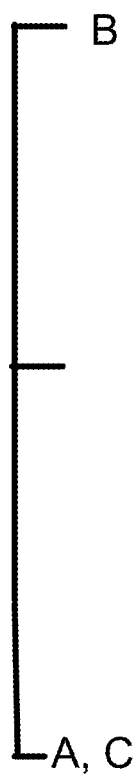
Figure 27C:
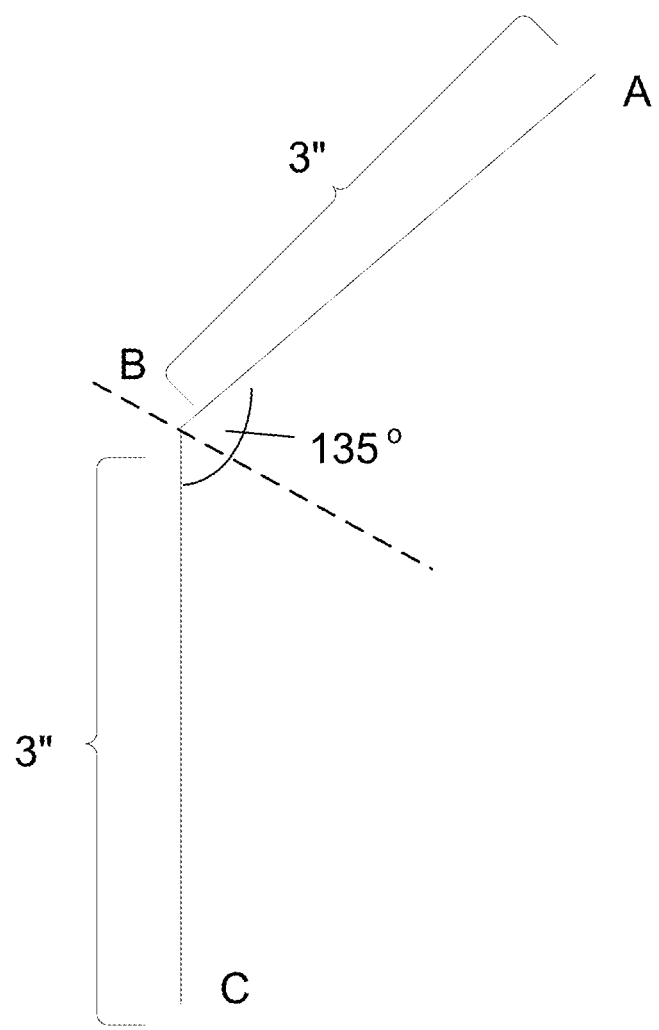
Figure 27D:
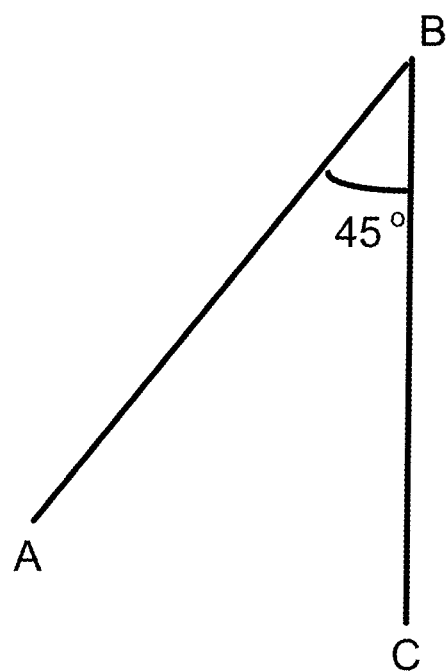
Figure 27E:
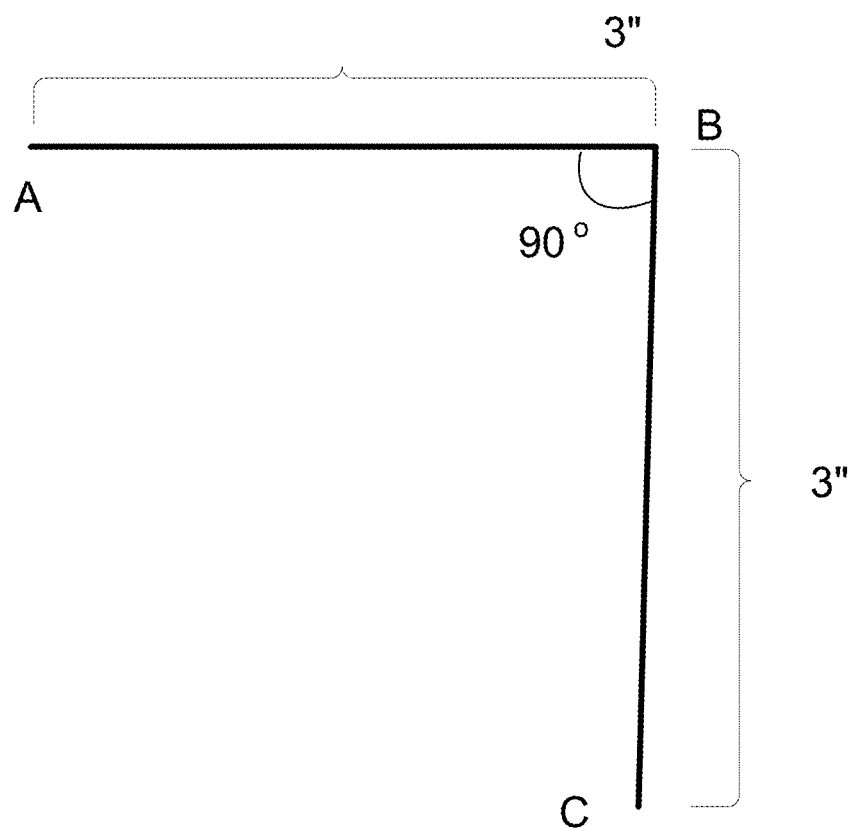

FIGS. 27a, 27b, 27c, 27d and 27e illustrate various possible angles for the selected route (2202). Accordingly, the value of the weighted radius varies. At FIG. 27a the selected route (2202) is bent at or the angle at the vertex of the bend is 0 degrees the value of the weighted radius (wr) is 2.5 units. FIG. 27b, illustrates a case when the angle at the vertex is 135 degrees the value of the weighted radius (wr) is 1.9052 units. In FIG. 27c, the angle at the vertex is 45 degrees the value of the weighted radius (wr) is 2.3979 units. In FIG. 27d, the angle at the vertex is 90 degrees the value of the weighted radius (wr) is 2.1514 units. The point D is approximately at a distance of 2.1514 units to the vertex B and an establishment located at point D can be considered as one of the locations of interest (144) to the user (101) that is in proximity to the selected route (2202). FIG. 27e, illustrates a case when the angle at the vertex is 180 degrees the value of the weighted radius (wr) is 1.8028. This is a special case that usually occurs on highways where the user (101) travels on a long straight route which has little or no angular deviations or vertices. Therefore, considering a mid-point of a long route can cover a very large area to identify locations of interest (144) which may be impractical. Therefore, the selected route (2202) in this case is analyzed by further dividing into shorter route segments, for example, at the highway exit points which can be considered as the route vertices which are 180 degrees apart. This facilitates analyzing the selected route (2202) to identify locations of interest (144) to the user (101) that are proximate to the highway exits. Hence, the area that is close to the selected route (2202) is covered by the route analyzer (1244).

Figure 28:
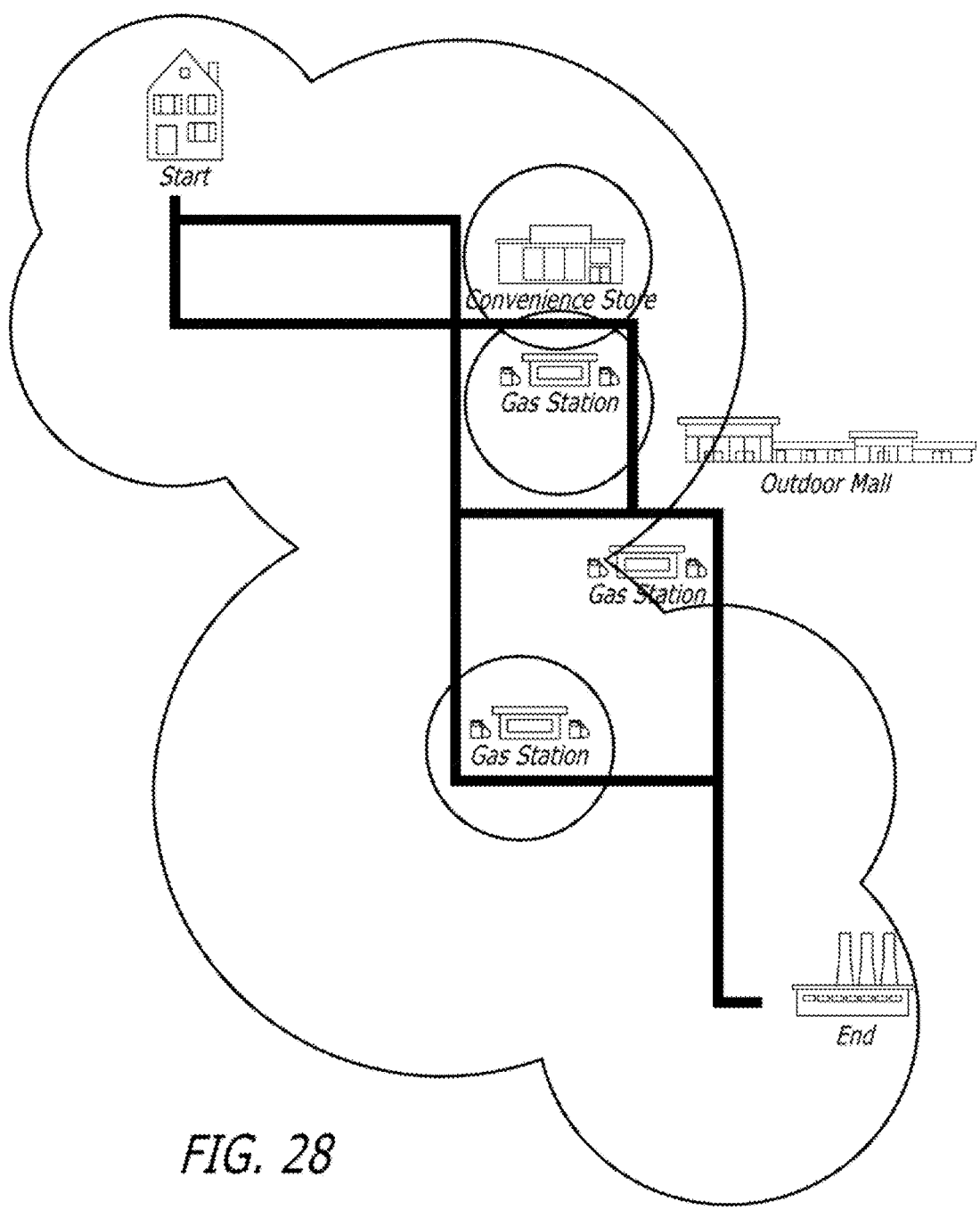
FIG. 28 illustrates a map wherein the convenience store, a first gas station and a second gas station are identified as candidates to be considered as the locations of interest in accordance with one embodiment.

FIG. 28 illustrates a map 2800 wherein the convenience store (location 11), a first gas station (location 12) and a second gas station (location 15) are identified as candidates to be considered as the locations of interest (144) to the user (101) along the selected route (1106). In particular, the area (2702) that is close to the selected route (1106) is demarcated by the outline (2002) and only locations lying within the area (2004) are considered as candidate locations. Accordingly, the outdoor mall (location 13) and the third gas station (location 14) which at least partially lie beyond the boundary of the outline (2002) are not considered as candidates for locations of interest (144) to the user. It may be appreciated that FIG. 28 and the discussion herein is only by the way of illustration and not limitation. Other factors such as user specific profile (131) can affect the selection of candidates for location of interest (144) so that locations that at least partially lie within the boundary of the outline (2002) can also be considered as candidate locations in accordance with certain embodiments.

Figure 29:
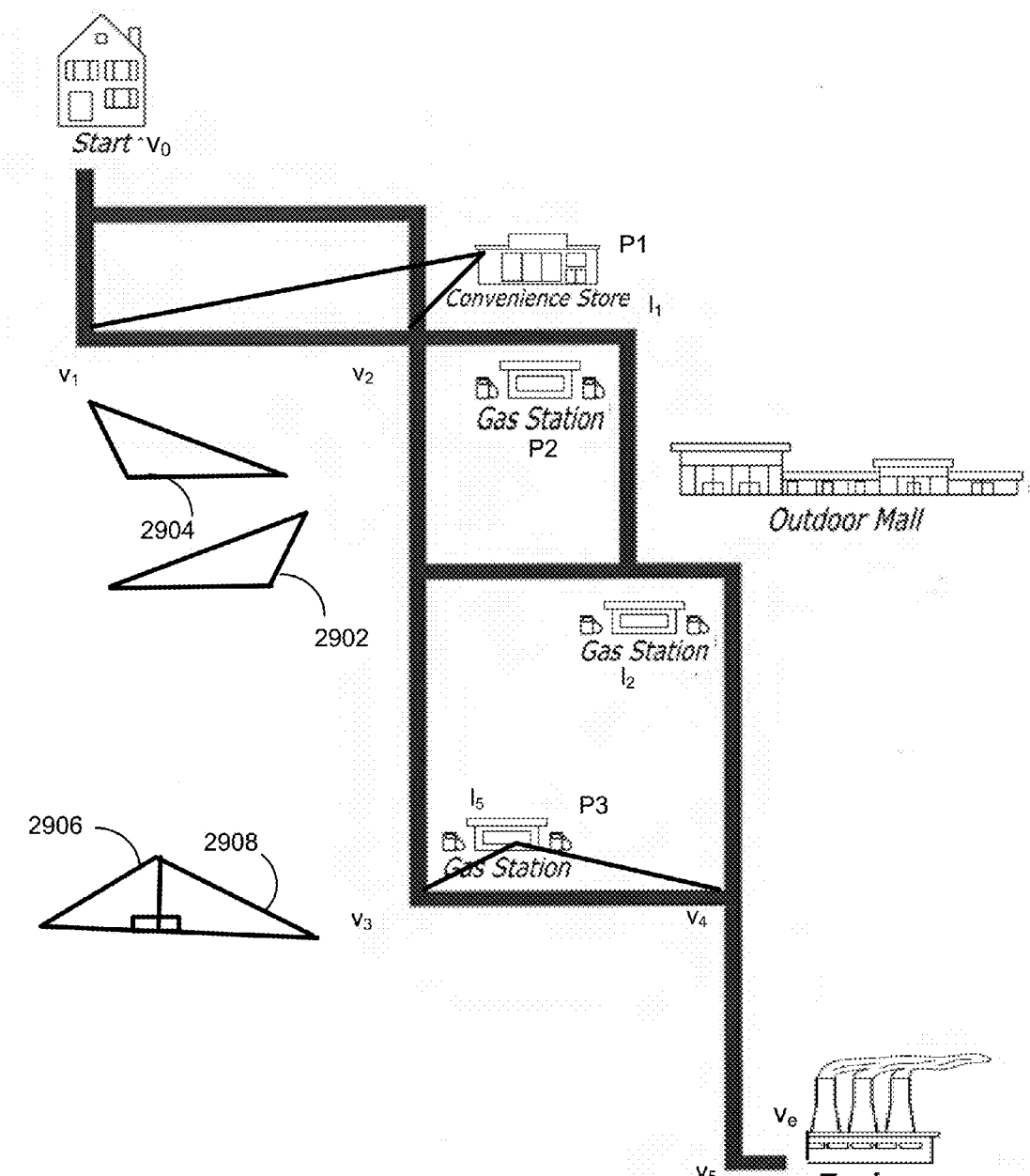
FIG. 29 illustrates an embodiment related to further determinations of proximity for the candidate locations in accordance with one embodiment.

FIG. 29 illustrates an embodiment related to further determinations of proximity for the candidate locations 11, 12 and 15 for determining one or more of the candidate locations where the user (101) is likely to spend time and therefore is a good candidate for providing location based services can be identified. In an embodiment, the locations 11, 12 and 15 can be ordered based on their respective distances from the selected route (1106) and their order of distances from the selected route (1106) can be an attribute that is considered for providing different types location based services. In an embodiment, the candidate locations 11, 12 and 15 can be further filtered so that only the closest location or two of the closest locations can be used for real-time messaging or location based services. FIG. 23 shows example methods that can be employed for determining respective distances of the candidate locations 11 and 15 from the selected route (1106). In this embodiment, the criterion for selecting a location as one of the locations of interest (144) is the distance of that location from the selected route (1106). Therefore, the area (2104) enclosed within the outline (2102) is further divided into isolated bubbles surrounding the candidate locations 11, 12 and 15 as shown in FIG. 27 and the respective distances of the candidate locations 11 and 15 from the selected route (1106) are determined.

In an embodiment, the method of determining the distances of the candidate locations 11, 12 and 15 to the selected route (1106) commences with identifying the route vertices that are nearest to one of the candidate locations 11, 12 and 15. Route vertices v1 and v2 are closest to the location 11. Knowing the distances of the route vertices v1 and v2 to the location 11, and using the law of sines, law of cosines it can be determined that the route vertices v1 and v2 form an oblique triangle with the location 11. Accordingly, the route vertices v1 and v2 can form one of the two oblique triangles 2902 and 2904 with the location 11. In this embodiment, the perpendicular distance (d1) between a reference point R on the selected route (1106) that and the convenience store (11) and a point on the selected route (1106) that is closest to the location (11) can be considered as the distance of the convenience store from the selected route (1106).

Similarly, it can be identified that route vertices v3 and v4 which are closest to the location 15 and the triangle formed by the three points v3, v4 and 15 is a non-oblique triangle (2906). Therefore, two right triangles (2906) and (2908) can be created and solved for the nearest side to obtain the shortest distance of the gas station location 15 from the selected route (1106). Based on various other criteria that may be defined in the portal (143) for example, user preferences comprised in the user specific profile (131) either one of or both the locations 11 and 15 can be selected for providing location based services.

Figure 30:
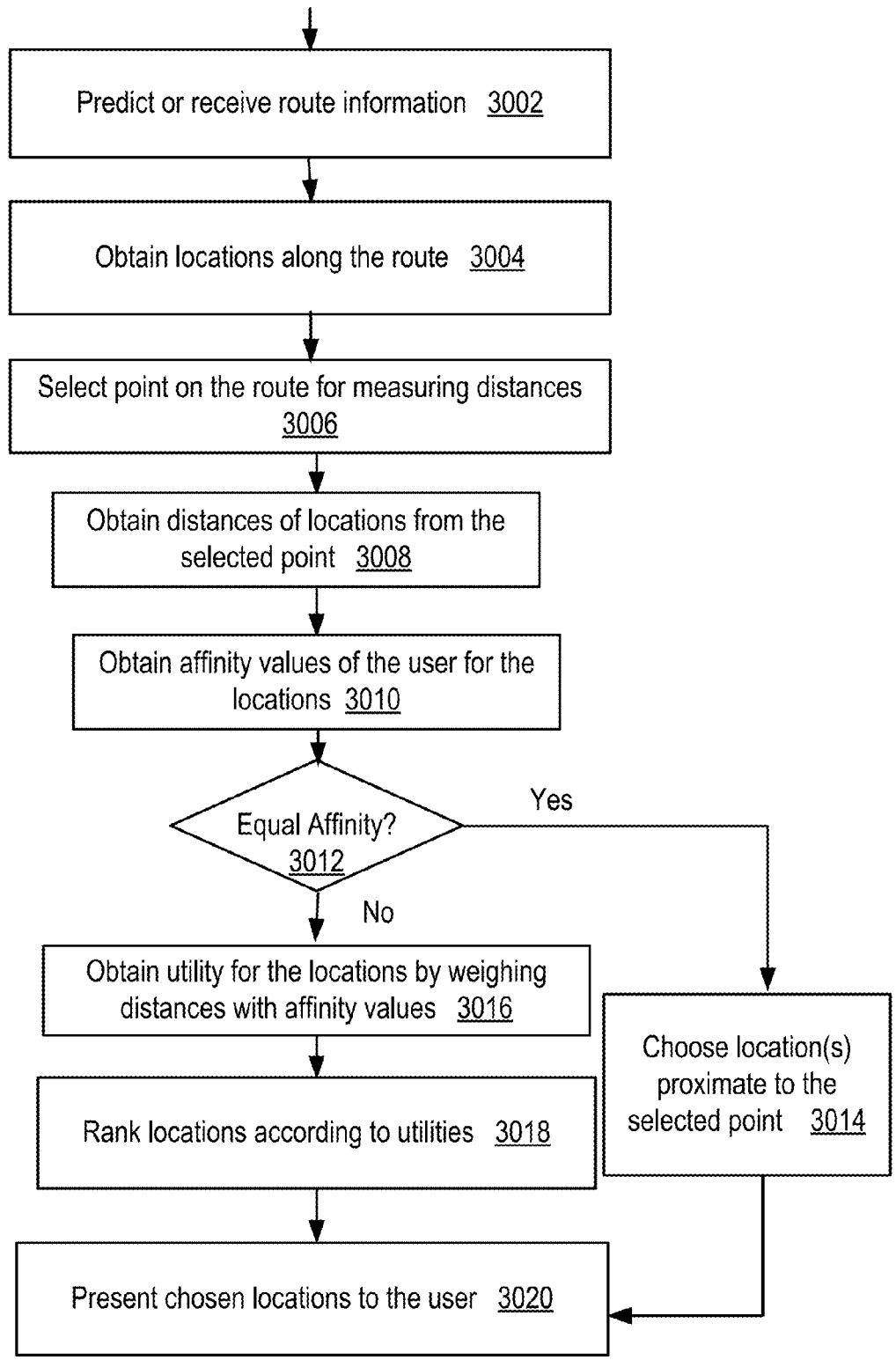
FIG. 30 shows a flow chart that details a method of determining the locations of interest to the user in accordance with one embodiment.

FIG. 30 shows a flow chart 3000 that details a method of determining the locations of interest (144) to the user (101) along the route (1106) taking into consideration the affinities that the user (101) has for particular merchants/locations. The method begins at 3002 with generation of a prediction regarding the user's (101) likely route (1106) or reception of information regarding a selected route (1106) of the user (101). At 3004, the locations, merchants and/or offers along the user's (101) route (1106) are obtained. In an embodiment, all the merchants, locations or offers can be selected. In an embodiment, the merchants/locations/offers can be filtered at 3004 based on general context data such as, date, day of the week or time of the day, particulars of the offers or user-specific context data such as profile information. At 3006 a point is selected for measuring the distances of the locations and at 3008 the distances of the locations are measured from the selected point. In an embodiment, the selected point is the starting point of the route or the origin and the distances are determined from the origin ls. In an embodiment the distances of the locations are determined from the destination le, wherein the destination can be selected or predicted in accordance with embodiments describe herein. The point from which the distances are measured can be selected depending on various user-specific and/or route-specific factors such as proximity of the user (101) to the origin (ls), user habits such as user providing reviews for a particular location. For example, if the user (101) has travelled past the mid-way point of the route (1106) then offers/locations closer to the destination might be selected. At 3010, the affinity values of the user for each of the locations are retrieved. If the affinity values are not readily available, they can be determined from other user specific profile information (131). As discussed herein, the affinity values can be represented as numbers within a certain range, for example from 0 to 1, with zero (0) representing the least affinity of the user for a given location, merchant, offer or combinations thereof and one (1) representing the highest affinity of the user for a given location, merchant, offer or combinations thereof.

At 3012, the affinity values determined at 3010 are compared. If it is concluded at 3012 that the user (101) has equal affinity for all the locations for which the affinity values are obtained, then locations that are proximate to the selected point or within a certain predefined threshold distance from the selected point are chosen at 3014. For example, all the locations within a certain threshold distance can be selected at 3014 in an embodiment. In an embodiment, the locations can be ranked in an ascending order of their distances to the selected point and the top N locations (N being a natural number) can be selected at 3014 as locations that are proximate to the selected point and presented to the user (101) at 3020. In an embodiment, location based services are associated with the locations/merchants that are presented to the user at 3020.

If at 3012, it is determined that different locations have different affinities for the user (101), a utility for each location is obtained at 3016 by weighing the affinities of each of the locations with the distance of the locations from the selected point. By the way of a non-limiting embodiment, utility can be calculated as a product of the affinity with an inverse of the distance obtained at 3008. At 3018, the locations are ranked by their utility, for example, in a descending order of their respective utilities and the location with highest utility is selected for presentation the user at 3020 in accordance with an embodiment. In another embodiment, the top N locations (N being a natural number) with the highest utility values are selected for presentation to the user (101) so that the user (101) may further choose any of the presented offers/locations.

Figure 31:
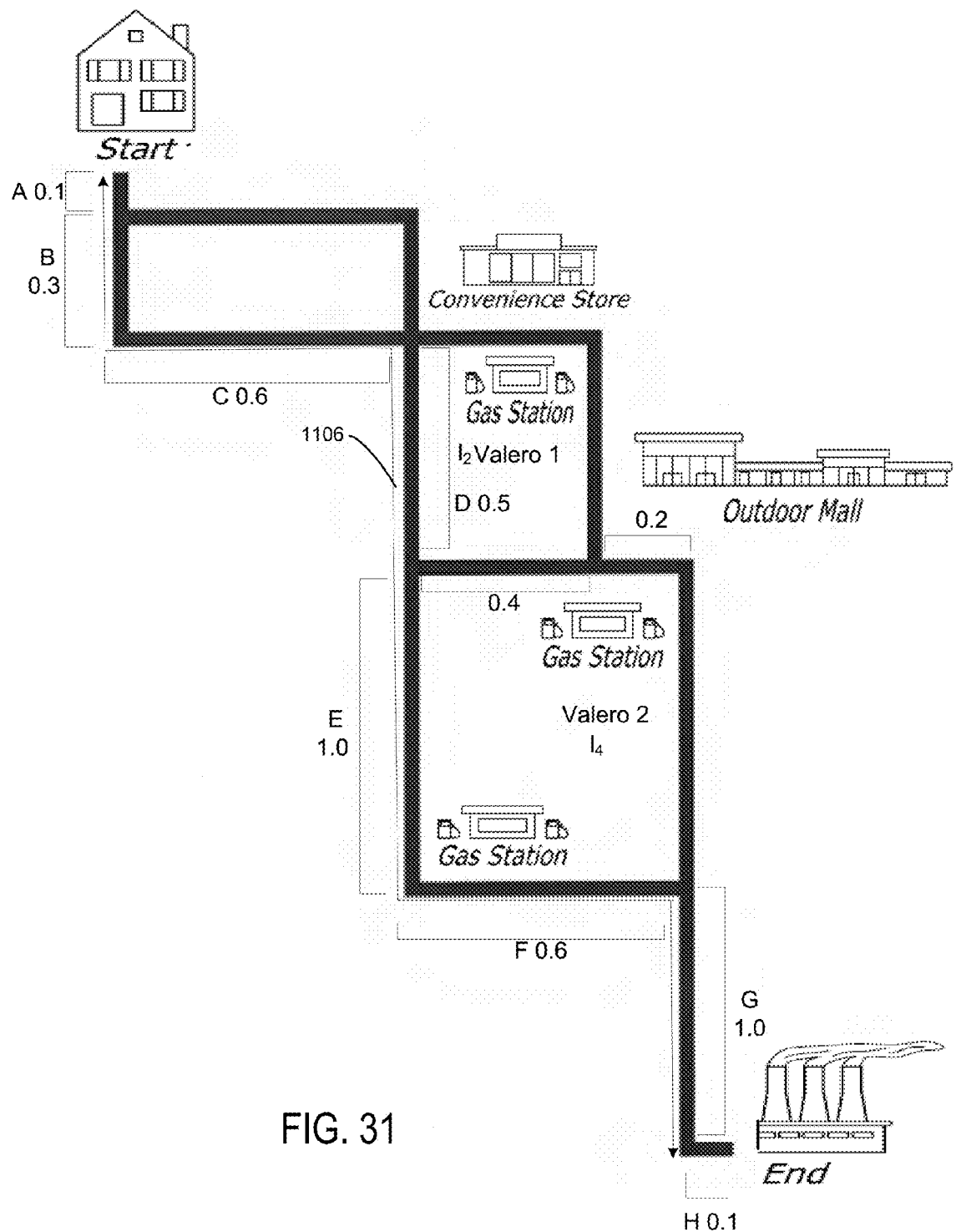
FIG. 31 shows a map including the route illustrating estimation of utility values in accordance with an embodiment.

FIG. 31 shows a map including the route (1106) and which shows the distances of the route segments between the origin (ls) and the destination (le). It may be noted that the distances are shown for the various route segments rs1 to rs6 (or segments A to H) in terms of kilometers, for example, in contrast to the segment lengths discussed in FIG. 15 which are taken to scale while analyzing locations on the route (1106). In particular, the total length of the route (1106) is the sum of the route segments, which is:

A+B+C+D+E+F+G+H=0.1+0.3+0.6+0.5+1.0+0.6+1.0+0.1=4.2 Kilometers.

Based on context information as set forth above, two locations, l2 (valero 1) and l4 (valero 2) are identified for further promotion to the user (101). In an embodiment, if both the locations l2 and l4 have equal affinity for the user (101), the location l2 which is closer to the origin ls is presented to the user (101) if the user is between the origin ls and a route mid-point as described supra. In an embodiment, if both the locations l2 and l4 have equal affinity for the user (101), the location l4 which is closer to the destination le is presented to the user (101) if the user is past the a route mid-point and is closer to the destination le.

In an embodiment, if both the locations have different affinities, the utility values are estimated for each location by weighing the affinities with the respective distances of the locations, l2 (valero 1) and l4 (valero 2) from a selected point. Following describes a non-limiting embodiment of calculating utility values for locations having unequal affinities for the user (101). For example, the first location l2 (valero 1) has an affinity of 0.5 and l4 (valero 2) has an affinity of 0.7 indicating that the user (101) initially has greater affinity for l4 (valero 2). Based on the map, following are the utility values when calculated as a product of the affinity with the inverse of the respective distances of the locations l2 and l4 from the selected point which in this case is the origin ls:

Utility for l2 (valero 1)=1/1.4 Km*0.5 aff=0.357 utility,
Utility for l4 (valero 2)=1/2.1 Km*0.7 aff=0.333 utility.

As the utility for location l2 (valero 1) is higher, it is selected for presentation to the user even though the affinity of the user (101) for this location is lower than the affinity for location l4 (valero 2). It may be appreciated that the details of the utility value calculations are shown only by the way of illustration and that the affinity can be weighed with any function that increases as the distance decreases.

Figure 32:
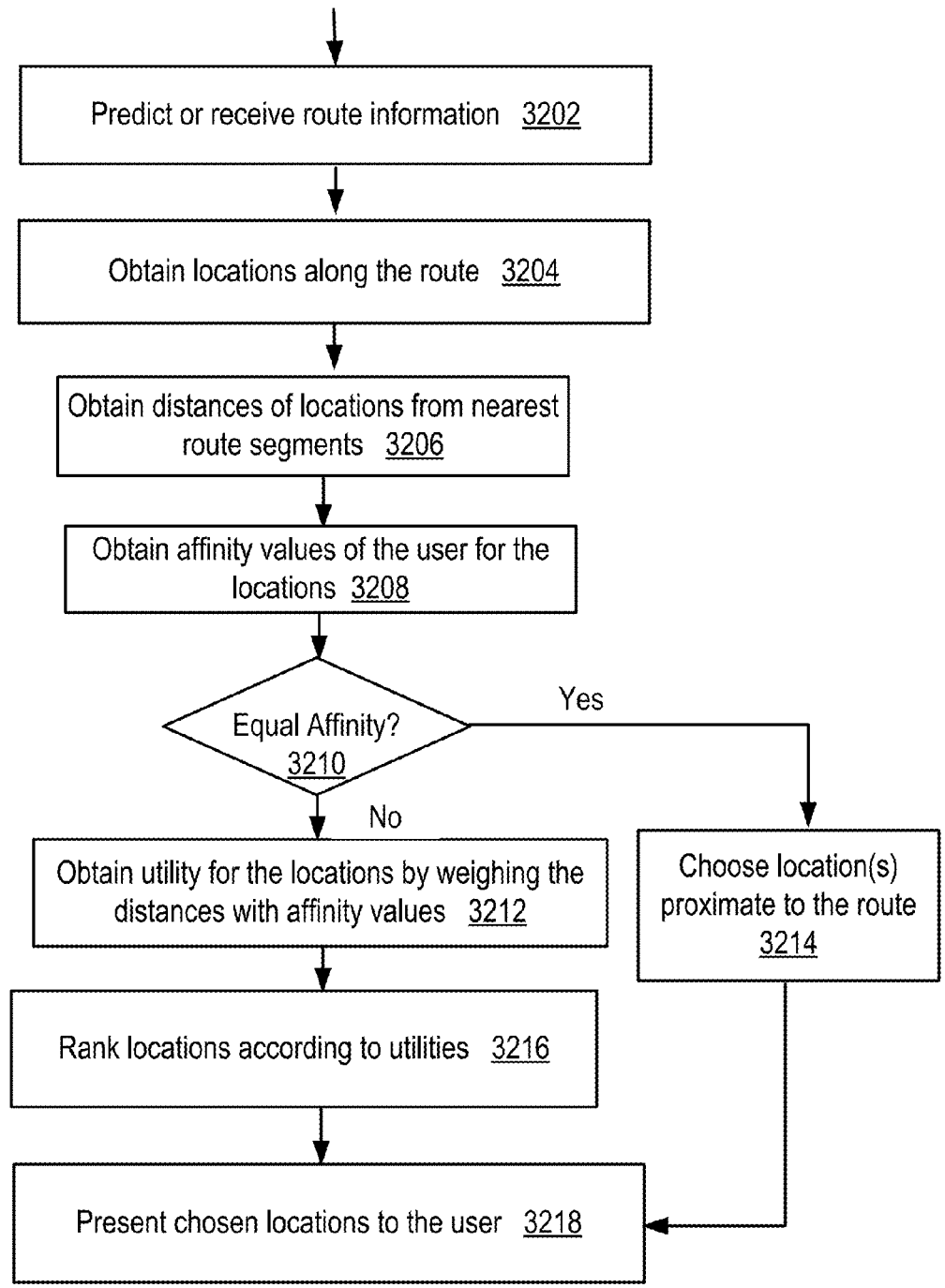
FIG. 32 shows a flow chart that details a method of determining the locations of interest to the user in accordance with one embodiment.

FIG. 32 shows a flow chart 3000 that details a method of determining the locations (144) that are of interest to the user (101) along the route (1106) and proximate to the route, or more particularly, the route segments, taking into consideration the affinities that the user (101) has for particular merchants/locations. The method begins at 3202 with generation of a prediction regarding the user's (101) likely route (1106) or reception of information regarding a selected route (1106) of the user (101). At 3204, the locations, merchants and/or offers along the user's (101) route (1106) are obtained in accordance to embodiments detailed supra. In an embodiment, all the merchants, locations or offers can be selected. In an embodiment, the merchants/locations/offers can be filtered at 3204 based on general context data such as, date, day of the week or time of the day, particulars of the offers or user-specific context data such as profile information. At 3206, the distances of the locations obtained at 3204 are measured from the route (1106) or more particularly, the distances of the locations are measured from the segments of the route (1106) that are closest to such locations. For example, the distance of the location 12 is measured from the route segment rs3. At 3208, the affinity values of the user (101) for each of the locations are retrieved. If the affinity values are not readily available, they can be determined from other user specific profile information (131). In an embodiment, the affinity values can be represented as numbers within a certain range, for example from 0 to 1, with zero (0) representing the least affinity of the user for a given location, merchant, offer or combinations thereof and one (1) representing the highest affinity of the user for a given location, merchant, offer or combinations thereof.

At 3210, the affinity values determined at 3208 for different locations, offers or merchants are compared. If it is determined at 3210 that the user (101) has equal affinity for all the locations for which the affinity values were obtained, then locations that are proximate to the route (1106) are chosen at 3214. In an embodiment, the locations within a predefined threshold distance of their respective route segments can be selected at 3214 as being proximate to the route (1106). In an embodiment, the locations can be ranked in an ascending order of their distances to their respective route segments so that the top N locations (N being a natural number) can be selected at 3214 and presented to the user (101) at 3218. In an embodiment, location based services are associated with the locations/merchants that are presented to the user at 3218.

If at 3210, it is determined that different locations have different affinities for the user (101), a utility for each location is obtained at 3212 by weighing the affinities of each of the locations with the distance of the locations from their respective route segments. By the way of a non-limiting embodiment, utility of a location can be calculated as a product of its affinity with an inverse of the distance obtained at 3206. At 3216, the locations are ranked for example, in a descending order of their respective utilities, and the location(s) with highest utility is selected for presentation the user at 3218 in accordance with an embodiment. In another embodiment, the top N locations (N being a natural number) with the highest utility values are selected for presentation to the user (101) so that the user (101) may further choose any of the presented offers/locations.

Figure 33:
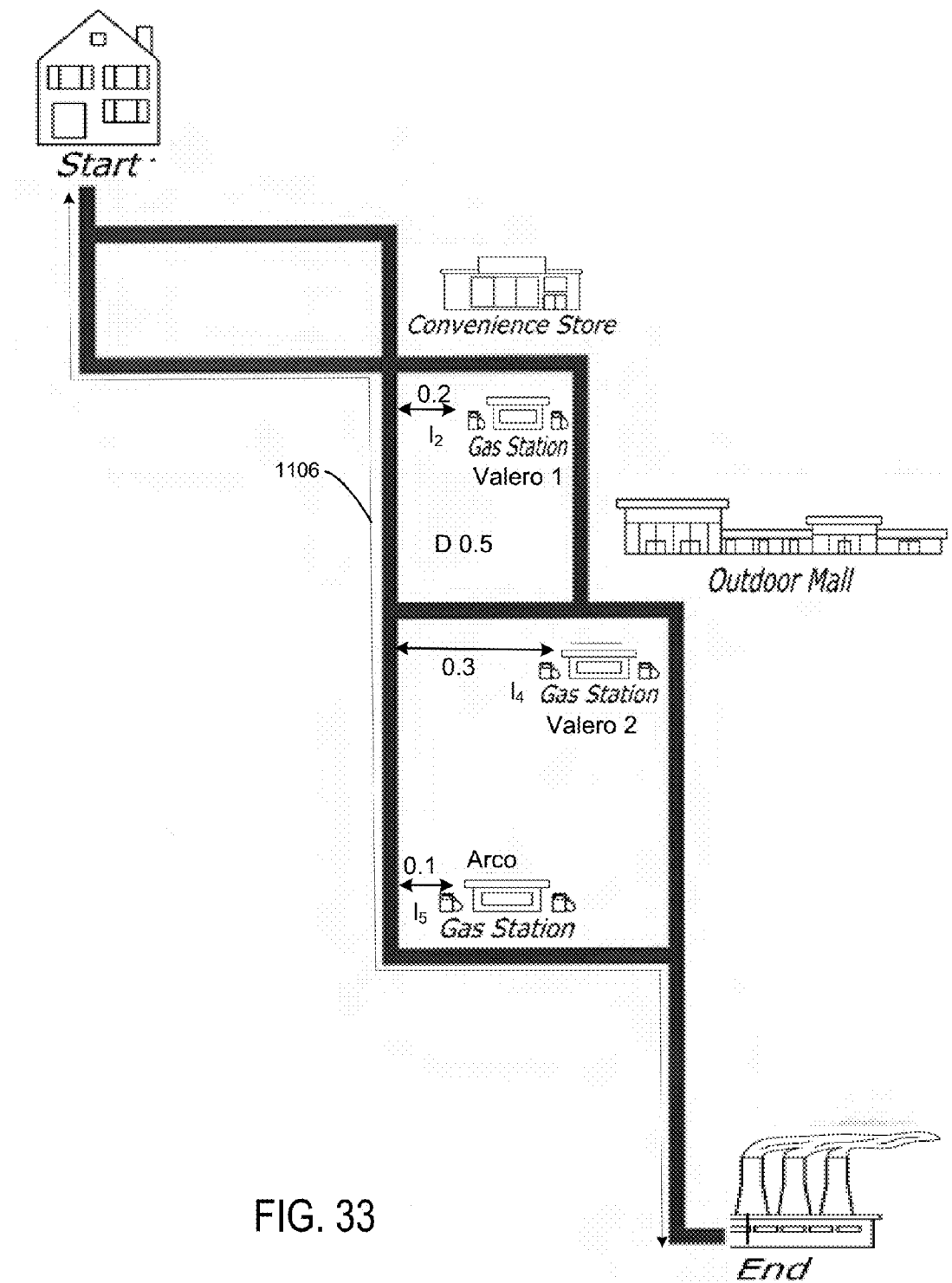
FIG. 33 shows a map including the route illustrating estimation of utility values in accordance with an embodiment.

FIG. 33 shows a map with the locations 12, 14, 15, along the route (1106) obtained for further promotion to the user. In an embodiment, one or more of the locations 12, 14, 15 can be selected upon further analysis for associating location based services such as presenting a promotional offer to the user. In this particular example all the three locations 12, 14, 15 lie along the route segment rs3. However, it may be appreciated that this is not necessary and that the locations may be closer to other segments of the route (1106) and such locations will be considered for presentation to the user based on their respective distances from their respective proximate route segments. Based on information such as, context information as set forth above, three locations, 12 (valero 1), 14 (valero 2) and 15 (arco 1) are identified for further promotion to the user (101). In an embodiment, the user (101) has equal affinity for Valero and Arco brands and hence all the locations 12, 14 and 15 have equal affinity for the user (101). Therefore, the location 15 (arco 1) which at 0.1 Km from the route segment (rs3) is selected as it is closest to the route segment (rs3) when compared to the location 12 (valero 1) which is at a distance of 0.2 Km from the route segment (rs3) and the location 14 (valero 2) which is at a distance of 0.3 Km from the route segment (rs3).

In an embodiment, the locations 12, 14 and 15 have different affinities and hence the selection of location(s) for presentation to the user (101) is based on their utility values.

In an embodiment, the utility values are estimated for each location by weighing the affinities with the respective distances of the locations 12, 14 and 15 from the route segment (rs3). Following describes a non-limiting embodiment of calculating utility values for locations having unequal affinities for the user (101). For example, the user (101) has an affinity of 0.25 for Arco brand and an affinity of 1.0 for Valero brand. Based on the map, following are the utility values when calculated as a product of the affinity with the inverse of the respective distances of the locations 12, 14 and 15 from the route segment (rs3):

Utility for 12 (valero 1)=1/0.2 Km*1 affinity=5 utility,

Utility for 14 (valero 2)=1/0.3 Km*1 affinity=3.33 utility, and

Utility for 15 (arco1)=1/0.1 Km*0.25 affinity=2.5 utility.

As the utility for location 12 (valero 1) is highest compared to other locations 14 and 15, location 12 (valero 1) is selected for presentation to the user (101) even when the location 15 is closest to the route segment (rs3). It may be appreciated that the details of the utility value calculations are shown only by the way of illustration and that the affinity can be weighed with any function that increases as the distance decreases for the estimation of the utility.

Figure 34:
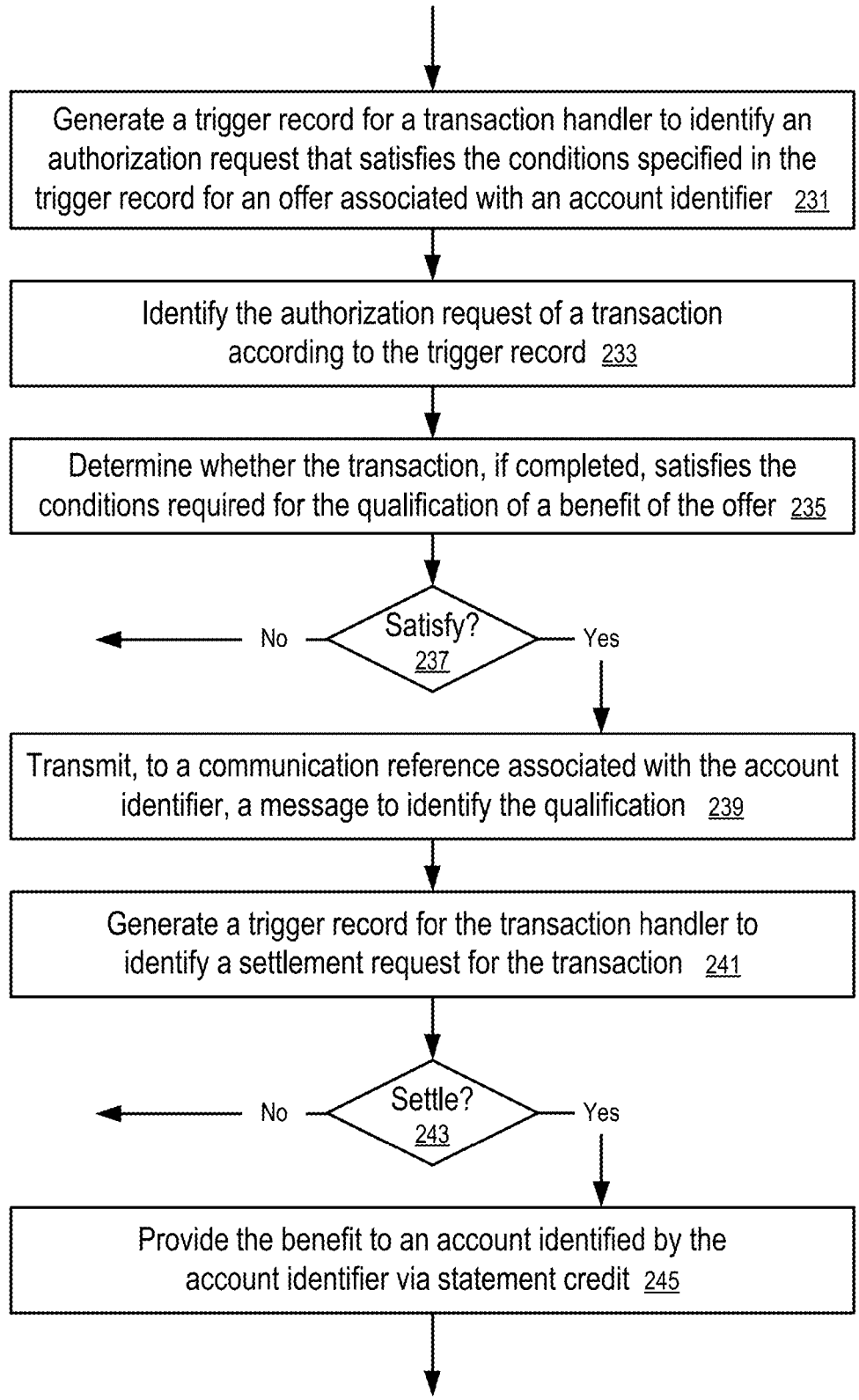
FIG. 34 shows a method to provide benefits according to one embodiment.

FIG. 34 shows a method to provide benefits according to one embodiment. In FIG. 34, the computing apparatus is configured to generate (231) a trigger record (207) for a transaction handler (103) to identify an authorization request (202) that satisfies the conditions specified in the trigger record (207) for an offer (186) associated with an account identifier (e.g., account data (111), account information (142), or account number (302)).

In FIG. 34, the computing apparatus is configured to identify (233) the authorization request (202) of a transaction according to the trigger record (207) and determine (235) whether the transaction, if completed, satisfies the conditions required for the qualification of a benefit of the offer (186) in accordance with the offer rules (203).

If the transaction satisfies (237) the benefit qualification conditions in accordance with the offer rules (203) of the offer (186), the computing apparatus is configured to transmit (239), to a communication reference (205) associated with the account identifier (e.g., account data (111), account information (142), or account number (302)), a message (204) to identify the qualification. The computing apparatus is configured to further generate (241) a trigger record (207) for the transaction handler (103) to identify a settlement request for the transaction. If the transaction is settled (243), the computing apparatus is configured to provide (245) the benefit of the offer (186) to a consumer account (146) identified by the account identifier (e.g., account data (111), account information (142), or account number (302)) via statement credit. In one embodiment, the statement credit is provided as part of the settlement operations of the transaction.

In one embodiment, a computer-implemented method includes: storing, in a computing apparatus having a transaction handler (103), a plurality of trigger records (207); processing, by the transaction handler (103), an authorization request (202) received from an acquirer processor (147), where the authorization request (202) is processed for a payment to be made by an issuer processor (145) on behalf of a user (101) having an account identifier (e.g., account data (111), account information (142), or account number (302)) associated with the issuer processor (145), and the acquirer processor (147) is configured to receive the payment on behalf of a merchant operating the transaction terminal (105).

In one embodiment, the method further includes: determining, by the transaction handler (103), whether the authorization request (202) matches one of the plurality of trigger records (207) by determining whether the attributes of the transaction associated with the authorization request (202) satisfies the conditions specified in one of the plurality of trigger records (207).

In one embodiment, if the authorization request (202) matches a trigger record (207) in the plurality of the trigger records (207), the computing apparatus is configured to identify a communication reference (205) of the user (101) in accordance with the trigger record (207), generate a message (204) regarding a benefit to be provided to the user (101) upon the completion of the payment, and transmit the message (204) to the user (101) via the communication reference (205) in real-time with the processing of the authorization request (202). In one embodiment, the communication reference (205) is one of: a phone number and an email address; and the message (204) is transmitted via at least one of: short message service and email.

In one embodiment, the message (204) is transmitted to a mobile phone of the user (101) via the communication reference (205).

In one embodiment, the message (204) is transmitted to the user (101) via a communication channel separate from a communication channel used to provide a response (206) to the authorization request (202).

In one embodiment, the method further includes the computing apparatus identifying an offer (186) based on transaction data (109) of the user; and the message (204) is configured to provide the offer (186).

In one embodiment, the computing apparatus includes the portal (143) configured to receive offer rules (203) from a merchant for the offer (186); and the offer (186) is identified for delivery in the real-time message (204) based further on the offer rules (203).

In one embodiment, the offer (186) is identified in real-time with the processing of the authorization request (202), or in response to a determination that the authorization request (202) matches the trigger record (207).

In one embodiment, the offer (186) is identified based on a profile (e.g., 131, or 341) of the user (101). In one embodiment, the profile (e.g., 131 or 341) summarizes the transaction data (109) of the user (101). In one embodiment, the computing apparatus includes the profile generator (121) configured to generate the profile (e.g., 341) from the transaction data (109) of the user (101) via a cluster analysis (329) and a factor analysis (327), as described in the section entitled "AGGREGATED SPENDING PROFILE."

In one embodiment, the message (204) indicates that a transaction for which the authorization request (202) is processed is eligible for the benefit of an offer (186) associated with the account identifier (e.g., account data (111)) of the user (101), when the transaction is eventually completed and settled.

In one embodiment, the offer (186) is stored in the data warehouse (149) in association with the account identifier (e.g., account data (111)); and the trigger record (207) identifies the offer (186) to allow the message broker (201) to further check whether the transaction meets the benefit redemption conditions of the offer (186).

In one embodiment, the computer apparatus is configured to determine whether the payment, if completed, entitles the user (101) to the benefit of the offer (186), in response to a determination that the authorization request (202) matches the trigger record (207); and the message (204) is transmitted to the user (101) via the communication reference (205) in response to an indication of the approval of the authorization request (202) and after a determination is made that the payment, if completed, entitles the user (101) to the benefit of the offer (186).

In one embodiment, the transaction handler (103) is configured to identify a settled transaction corresponding to the authorization request (202) that triggers the message (204), and then provide the benefit of the offer (186) to the user (101) via statement credits, or loyalty program points, after the settled transaction is identified.

In one embodiment, the transaction handler (103) is configured to provide the benefit of the offer (186) to the user (101) via point of sale credit using digital coupons transmitted to cellular telephone of the user (101) during the processing of the payment at the transaction terminal (105).

In one embodiment, the transaction handler (103) is configured to process a settlement request for the payment and provide the benefit of the offer (186) to the user (101) via statement credit to a consumer account (146) corresponding to the account identifier (e.g., account data (111)) in response to the completion of the settlement of the payment, or as part of the settlement of the payment.

In one embodiment, the computing apparatus is configured to generate a second trigger record for the transaction handler (103) to monitor the settlement of the payment, in order to provide a benefit in response to the settlement of the payment, or as part of the settlement of the payment.

In one embodiment, the computing apparatus includes: a data warehouse (149) configured to store a plurality of trigger records (207); a transaction handler (103) coupled with the data warehouse (149) and configured to process an authorization request (202) received from an acquirer processor (147); and a message broker (201) coupled with the transaction handler (103) such that after the transaction handler (103) determines that the authorization request (202) matches a trigger record (207) in the plurality of the trigger records (207), the message broker (201) identifies a communication reference (205) of the user (101) in accordance with the trigger record (207) and generates a message (204) regarding a benefit to be provided to the user (101) upon completion of the payment. The computing apparatus further includes a media controller (115) coupled with the message broker (201) to transmit the message (204) to the user (101) via the communication reference (205) in real-time with the transaction handler (103) processing the authorization request (202).

Details about the system in one embodiment are provided in the section entitled "CENTRALIZED DATA WAREHOUSE" and "HARDWARE."

Variations

Some embodiments use more or fewer components than those illustrated in the figures.

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010, assigned U.S. Pat. App. Pub. No. 2010/0174623, and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In FIG. 2, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

A "card-present" transaction typically involves physically presenting the account identification device (141), such as a financial transaction card, to the merchant (e.g., via swiping a credit card at a POS terminal of a merchant); and a "card-not-present" transaction typically involves presenting the account information (142) of the consumer account (146) to the merchant to identify the consumer account (146) without physically presenting the account identification device (141) to the merchant or the transaction terminal (105).

The transaction records (301) of one embodiment may further include details about the products and/or services involved in the purchase.

When there is voluminous data representing the transaction records (301), the spending patterns reflected in the transaction records (301) can be difficult to recognize by an ordinary person.

In FIG. 2, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

Examples of the spending frequency variables (313) and spending amount variables (315) defined for various merchant categories (e.g., 306) in one embodiment are provided in U.S. patent application Ser. No. 12/537,566, filed Aug. 7, 2009, assigned U.S. Pat. App. Pub. No. 2010/0306029, and entitled "Cardholder Clusters," and in U.S. patent application Ser. No. 12/777,173, filed May 10, 2010, assigned U.S. Pat. App. Pub. No. 2010/0306032, and entitled "Systems and Methods to Summarize Transaction Data," the disclosures of which applications are hereby incorporated herein by reference.

In FIG. 2, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

The transaction records (301) can be aggregated according to a buying entity, or a selling entity. For example, the aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular merchant having transactions with multiple accounts can be aggregated for a merchant level analysis. For example, the transaction records (301) for a particular merchant group can be aggregated for a merchant group level analysis. The aggregation (317) can be formed separately for different types of transactions, such as transactions made online, offline, via phone, and/or "card-present" transactions vs. "card-not-present" transactions, which can be used to identify the spending pattern differences among different types of transactions.

In FIG. 2, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

In FIG. 2, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In FIG. 2, a factor analysis (327) is performed to reduce the redundancy and/or correlation among the variables (e.g., 313, 315). The factor analysis (327) identifies the definitions (331) for factors, each of which represents a combination of the variables (e.g., 313, 315). A factor from the factor analysis (327) is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty).

In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In general, an aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353); recurrent/installment transactions are combined (355); and account data are selected (357) according to a set of criteria related to activity, consistency, diversity, etc.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109).

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

Optionally, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Details about aggregated spending profile (341) in one embodiment are provided in U.S. patent application Ser. No. 12/777,173, filed May 10, 2010, assigned U.S. Pat. App. Pub. No. 2010/0306032, and entitled "Systems and Methods to Summarize Transaction Data," the disclosure of which is hereby incorporated herein by reference.

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. patent application Ser. No. 13/675,301, filed Nov. 13, 2012, assigned U.S. Pat. App. Pub. No. 2013/0124263, and entitled "Systems and Methods to Summarize Transaction data," the disclosure of which is hereby incorporated herein by reference.

Transaction Processing and Data

FIG. 4 shows a system to provide information and/or services based on transaction data (109) according to one embodiment.

In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127), aggregated spending profile (341), offer redemption notification, etc. The portal (143) may be implemented as a web portal, a telephone gateway, a file/data server, etc.

In FIG. 4, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 4, the transaction handler (103) uses the data warehouse (149) to store the records about the transactions, such as the transaction records (301) or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 4, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 4, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned U.S. Pat. App. Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 5 illustrates a transaction terminal according to one embodiment. The transaction terminal (105) illustrated in FIG. 5 can be used in various systems discussed in connection with other figures of the present disclosure. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 7. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:
   identifying, by a computing apparatus, a plurality of locations;
   determining, by the computing apparatus and based on a current location of a user along a route, a portion of the route from which respective distances from the locations are computed;
   computing, by the computing apparatus, the respective distances from the locations to the portion of the route of predicted travel of the user;
   computing, by the computing apparatus, affinity values of the user for the locations based on electronic payment transaction data of the user;
   computing respective utility values of the locations from a predetermined function based on the affinity values of the user for the locations and the respective distances of the locations, wherein each utility value of a location is the predetermined function of an affinity value of the user for the location, and a distance of the location to the route, where the utility value of the location computed from the predetermined function increases when the affinity value of the user for the location increases, and when the distance of the location decreases;
   ranking, by the computing apparatus, the locations based on the respective utility values;
   selecting, by the computing apparatus, one or more top ranked locations from the plurality of locations based on the utility values; and
   presenting, by the computing apparatus to the user, the one or more selected locations.

2. The computer implemented method of claim 1, wherein the utility value of the location is proportional to the affinity value of the user for the location.

3. The computer implemented method of claim 1, wherein the utility value of the location is inverse proportional to the distance of the location to the route.

4. The computer implement method of claim 1, wherein the utility value of the location is proportional to the affinity value of the user for the location divided by the distance of the location to the route.

5. A computing apparatus, comprising:
at least one microprocessor; and
memory storing instructions configured to instruct the at least one microprocessor to at least:
receive, in the computing apparatus, information of routes traversed by a user;
identify, by the computing apparatus, locations on the routes;
organize, by the computing apparatus, the routes as a set of route words in a route dictionary, wherein each route word identifies one of the routes using a sequence of symbols, each of the symbols in the route words uniquely identifies one of the locations, each of the locations is uniquely identified by one of the symbols in the route words;
store, by the computing apparatus, information identifying travels of the user along the routes in association with the route words in the route dictionary, including frequency of travel along routes as term frequency of the route words;
predict, by the computing apparatus using the route dictionary, a remaining portion of a current route of a user from the route dictionary based on looking up in the route dictionary route words starting with one or more symbols representing one or more locations on a traversed portion the current route that have been traversed by the user;
identify, by the computing apparatus, a plurality of points of interest
determine, by the computing apparatus and based on a current location of the user along the current route, a portion of the current route from which distances from the points of interests are computed;
compute, by the computing apparatus, the distances from the points of interests to the portion of the current route;
compute, by the computing apparatus, affinity values of the user for the points of interests base on electronic payment transaction data of the user;
combine, by the computing apparatus, the distances and the affinity values to generate utility values of the points of interests;
select, by the computing apparatus, top points of interests based on the utility values; and
present, by the computing apparatus, the top points of interests to the user while the user is traversing the current route.

6. The computing apparatus of claim 5, wherein the distances from the points of interests are computed to the remaining portion of the current route.

7. The computing apparatus of claim 5, wherein the distances from the points of interests are computed to an origin or destination of the current route.

8. The computing apparatus of claim 5, wherein the distances from the points of interests are computed to respective segments of the route that are closest to the locations respectively.

9. The computing apparatus of claim 5, wherein the utility values for each of the locations is a product of the affinity value and the respective distance of each location from the selected portion.

10. A non-transitory computer storage medium storing instructions configured to instruct a computing apparatus to perform a method, the method comprising:
identifying, by a computing apparatus, a route to be traversed by a user;
identifying, by the computing apparatus, a plurality of points of interest;
determining, by the computing apparatus, lengths of line segments of the route;
computing, by the computing apparatus, threshold lengths for a set of vertexes of the route as combination of the lengths of the line segments of the route and a threshold value;
dividing, by the computing apparatus, the plurality of points of interest into:
a first subset of points of interest within an area around the route, wherein each of the first subset of points of interest has a distance to a vertex among the vertexes of the route less than a respective threshold length associated with the vertex; and
a second subset of points of interest outside an area around the route, wherein each of the second subset of points of interest has distances to the vertexes of the route greater than respective threshold lengths associated with the vertexes;
determining, by the computing apparatus and based on a current location of the user along the route, a portion of the route from which distances from the first subset of points of interests are computed:
computing, by the computing apparatus, the distances from the first subset of points of interests to the portion of the route;
computing, by the computing apparatus, affinity values of the user for the first subset of points of interests base on electronic payment transaction data of the user;
combining, by the computing apparatus, the distances and the affinity values to generate utility values of the first subset of points of interests;
selecting, by the computing apparatus, top points of interests based on the utility values; and
communicating, by the computing apparatus, the top points of interests to the user.

11. The non-transitory computer storage medium of claim 10, wherein the distances from the first subset of points of interests are computed to an origin or destination of the route.

12. The non-transitory computer storage medium of claim 10, wherein the distances from the first subset of points of interests are computed to respective route segments of the route that are closest to the locations respectively.

13. The non-transitory computer storage medium of claim 10, wherein the utility values are proportional to the affinity values and inverse proportional to the distances.

14. The non-transitory computer storage medium of claim 10, wherein the threshold lengths are a predetermined function of:
the lengths of the line segments of the route; and
the threshold value.

* * * * *